(12) United States Patent
Peck

(10) Patent No.: US 10,672,094 B2
(45) Date of Patent: Jun. 2, 2020

(54) RECONFIGURABLE LIGHT-DIRECTED PICK/PUT SYSTEM

(71) Applicant: Fastfetch Corporation, Pendleton, SC (US)

(72) Inventor: John C. Peck, Seneca, SC (US)

(73) Assignee: Fastfetch Corporation, Pendleton, SC (US)

( * ) Notice: Subject to any disclaimer, the term of this patent is extended or adjusted under 35 U.S.C. 154(b) by 34 days.

(21) Appl. No.: 15/942,171

(22) Filed: Mar. 30, 2018

(65) Prior Publication Data

US 2018/0286002 A1    Oct. 4, 2018

Related U.S. Application Data

(60) Provisional application No. 62/480,504, filed on Apr. 2, 2017.

(51) Int. Cl.
*G06Q 50/28* (2012.01)
*G05B 15/02* (2006.01)
*G06Q 10/06* (2012.01)

(52) U.S. Cl.
CPC ............ *G06Q 50/28* (2013.01); *G05B 15/02* (2013.01); *G06Q 10/06311* (2013.01)

(58) Field of Classification Search
CPC combination set(s) only.
See application file for complete search history.

(56) References Cited

U.S. PATENT DOCUMENTS

| | | |
|---|---|---|
| 3,739,339 A | 6/1973 | Hillhouse et al. |
| 5,505,473 A | 4/1996 | Radcliffe |
| 5,877,698 A | 3/1999 | Kusnier et al. |
| 5,877,962 A | 3/1999 | Radcliffe |
| 6,124,800 A | 9/2000 | Beard et al. |
| 6,775,588 B1* | 8/2004 | Peck ................. B65G 1/137 700/214 |
| 8,019,463 B2 | 9/2011 | Peck |
| 2007/0025830 A1 | 2/2007 | Solomon et al. |
| 2007/0050080 A1* | 3/2007 | Peck ................. B65G 1/137 700/214 |

(Continued)

OTHER PUBLICATIONS

International search report and written opinion for PCT/US2018/025612.

*Primary Examiner* — Kyle O Logan
(74) *Attorney, Agent, or Firm* — Kim and Lahey Law Firm LLC; Douglas W. Kim

(57) ABSTRACT

This invention is a dynamically reconfigurable pick-put system comprising: a digitally transformable mobile unit having a mobile unit computer and a mobile unit light bar controller, with a set of transformable mobile unit computer readable instructions included with the digitally transformable mobile unit that can digitally transform the mobile unit from a mobile unit configuration to a stationary unit configuration and can (a) direct a user to a particular stationary unit, actuate the mobile unit light bar to identify a location on the digitally transformable mobile unit where the item picked from the stationary unit is to be placed on the digitally transformable mobile unit, when in the mobile unit configuration, and (b) actuate the mobile unit light bar to identify the location of an item on the digitally transformable mobile unit to be picked when in the stationary unit configuration.

20 Claims, 16 Drawing Sheets

(56) References Cited

U.S. PATENT DOCUMENTS

2010/0316468 A1\* 12/2010 Lert ...................... B65G 1/045
                                                                  414/273
2013/0211977 A1    8/2013 Lyon et al.
2017/0015502 A1\*  1/2017 Engel .................... B65G 1/065

\* cited by examiner

PICKING REPORT

Start: 2/1/2010  End: 2/1/2010

| Day | Min/PT | Sec/PL | Sec.Qty | Min | #PT | #PL | ToPick | Picked | Short | #PL/Hr |
|---|---|---|---|---|---|---|---|---|---|---|
| 2/15/2010 | 2.3 | 18 | 6 | 175 | 75 | 597 | 1636 | 1638 | 0 | 200.0 |
| 2/16/2010 | 2.2 | 20 | 7 | 249 | 114 | 763 | 2046 | 2044 | 8 | 180.0 |
| 2/17/2010 | 1.6 | 13 | 4 | 144 | 90 | 658 | 1960 | 1959 | 1 | 276.9 |
| 2/18/2010 | 2 | 18 | 8 | 228 | 115 | 748 | 1611 | 1611 | 0 | 200.0 |
| 2/19/2010 | 2 | 19 | 5 | 132 | 65 | 429 | 1542 | 1541 | 1 | 189.5 |
| 2/22/2010 | 1.6 | 18 | 7 | 134 | 83 | 455 | 1221 | 1221 | 0 | 200.0 |
| 2/23/2010 | 1.5 | 15 | 5 | 258 | 173 | 1021 | 2823 | 2822 | 1 | 240.0 |
| 2/24/2010 | 1.9 | 15 | 5 | 207 | 112 | 822 | 2430 | 2423 | 7 | 240.0 |
| 2/25/2010 | 1.9 | 18 | 7 | 157 | 84 | 509 | 1389 | 1383 | 6 | 200.0 |
| 2/26/2010 | 1.7 | 15 | 7 | 143 | 83 | 566 | 1303 | 1294 | 9 | 240.0 |
| 3/1/2010 | 1.1 | 11 | 3 | 93 | 81 | 519 | 1940 | 1924 | 16 | 327.3 |
| 3/2/2010 | 1.8 | 18 | 6 | 336 | 191 | 1136 | 3113 | 3110 | 3 | 200.0 |
| 3/3/2010 | 1.7 | 16 | 5 | 180 | 107 | 673 | 1993 | 1989 | 4 | 225.0 |
| 3/4/2010 | 1.6 | 19 | 8 | 74 | 46 | 235 | 591 | 591 | 0 | 189.5 |

| PickTicket | Time | PDAname | Sec/PL | Sec/Qty | Sec/PT | #PL | #PT | ToPick | Picked | Picked |
|---|---|---|---|---|---|---|---|---|---|---|
| WRA3964048 | 03/04/07:47 AM | JFL003 | 34 | 10 | 101 | 3 | 10 | | | 10.0 |
| WRA3364049 | 03/04/07:39 AM | JFL003 | 49 | 10 | 438 | 9 | 43 | | | 43.0 |
| WRA3964052 | 03/04/07:45 AM | JFL003 | 10 | 10 | 10 | 1 | 1 | | | 1.0 |
| WRA3964057 | 03/04/09:43 AM | JFL003 | 30 | 8 | 59 | 2 | 7 | | | 7.0 |
| WRA3964058 | 03/04/09:42 AM | JFL003 | 8 | 8 | 32 | 4 | 4 | | | 4.0 |
| WRA3364064 | 03/04/08:09 AM | JFL003 | 19 | 19 | 95 | 5 | 5 | | | 5.0 |
| WRA3964068 | 03/04/09:39 AM | JFL003 | 24 | 8 | 142 | 17 | 47 | | | 17.0 |
| WRA3964073 | 03/04/08:09 AM | JFL003 | 19 | 19 | 57 | 3 | 3 | | | 3.0 |

Fig. 6B

RECONFIGURABLE LIGHT-DIRECTED PICK/PUT SYSTEM

BACKGROUND OF THE INVENTION

1) Field of the Invention

The invention is directed to an automated distributed system using audio and visual indicators to facilitate the retrieval of items, sometimes called stock keeping units (SKUs), that can be stored in uniquely identified locations within a facility such as a warehouse. Item locations for item (or SKU) retrieval and the subsequent locations for placement of items can be associated with uniquely identified receptacles.

2) Description of Related Art

In commercial transactions, typically goods do not pass directly from the manufacturer to the customer. For several reasons including geographic, volume efficiencies, product characteristics, and goods from many manufacturers can be transported from the respective manufacturer to a distribution center or warehouse where they are then stored and picked for subsequent distribution. Orders are provided to the distribution center or warehouse which are filled and transported to the ordering entity, whether retailer or end customer.

Filling orders from stored inventory requires steps that can include: locating the precise item in the storage facility, retrieving (or picking) the desired quantity of that item, and storing (or putting) the retrieved items in a designated container or receptacle. The basic steps may apply to a variety of situations in which items must be identified, selected, and distributed or placed in a second location. Frequently this process is generally described in terms of picking or order fulfillment.

Storage in a warehouse or other facility may be viewed as a nested or hierarchical arrangement with bays arranged along aisles, shelves located in or on a bay, locations in or on a shelf and items in or on a location. Thus, the physical location of a specific item could be an "address" in the storage facility comprising the aisle, the bay along that aisle, the shelf in a bay, and the location on the shelf or bay. So long as a protocol exists to associate a SKU with each unique combination of aisle, bay, shelf, or location, identification of a particular SKU is unnecessary to identify or characterize the item to be picked.

Historically, manual paper systems of pick and put have been improved and advanced with computerized and light assisted systems such as shown in U.S. Pat. Nos. 6,775,588 and 8,019,463, incorporated by reference. These computer and electronic advancements have played a role in improvements to the warehousing order fulfillment industry as shown in U.S. Pat. No. 3,739,339 which describes a system that is characteristic of the status of some current pick and put technologies for many warehouse and other storage—distribution situations. While using a punch-card system, this reference provides for a put-to-light process with a separate light system wired to individual containers or receptacles. Major deficiencies of this system include the requirement of hard wire communications of the light systems, communications through the card reader to a central computer, and the fact that overall efficiency and performance of the system degrades as the number of lights increases thereby preventing advantageous scalability of these systems. The system has virtually no fault-tolerance since failure of the central computer causes the entire system to fail. Further, changing the configuration of the system for dynamic slotting is challenging.

Radio communications have been applied to inventory related selection applications such as shown in U.S. Pat. No. 5,877,698. This reference describes a system of radio transmitters positioned throughout a supermarket with mobile receivers positioned on shopping carts commonly used by customers. When a receiver is within a limited range of any specific transmitter, an exclusive link is established whereby the transmitter sends to the receiver a specific advertising message calling attention to a "bargain" product at a specific nearby location. U.S. Pat. No. 6,124,800 discloses a route delivery system utilizing both local area network and wide area network radio frequencies to communicate inventory data between an end delivery point and a stocked delivery vehicle, and between the vehicle and a base office to minimize the number of actual visits a service person must make to deliver the necessary inventory items to a specific end point.

U.S. Pat. Nos. 5,505,473 and 5,877,962 disclose a computer-based system to facilitate placement of articles picked by an attendant from inventory storage shelves and deposited in delivery containers mounted on a cart. A scanner mounted on the cart is used to read codes on either the location or item to be picked to validate the designated pick.

However, of the above attempts to improve order fulfillment, none specifically addresses the needs of slotting. Slotting traditionally has been described as the physical placement of products within a warehouse or other storage facility designed to maximize the use of a facility's available space by improved storage and picking efficiency while reducing handling costs. Slotting is a process that can reduce picking time by grouping commonly or frequently ordered products, sometimes called high velocity SKUs, together to reduce the travel time during picking. SKUs can be designated high velocity when they are in high demand, or for other reasons. Slotting can include the goal of optimizing travel time by placing products near the location where picking starts or ends and balancing workload across multiple workers. The decision concerning where to place items in a facility can be based on a number of factors such as item size, historical demand, promotional campaigns, or the number of orders for which the product is picked. Highly accessed products are sometimes placed in prime locations that have the least travel time and best ergonomics (e.g. those associated with reaching). Seasonal products are often moved to more easily accessible areas during high volume seasons and into less accessible areas in off-seasons. The quantity of the pick can also affect slotting decisions. For example, depending on order contents, locations may be slotted based on the customer demand for full vs. partial pallets, full vs. partial cases or single units and the like. The product characteristics can be used to make slotting decision such as size (e.g. large items packed into boxes first that often leads to better packing densities and reduces damage to other fragile products later packed in the same boxes), special handling, secure storage, environmental controls, or material handling equipment needs. Slotting products that may be used or ordered together can improve efficiency. In some cases, developing location layouts that support truck-loading sequences or store delivery routes can improve efficiencies. Slotting can require the physical movement of an item in a warehouse, or other facility, which interrupts the picking process and can reduce order fulfillment rates and efficiencies, both of which can result in increased costs. Slotting can be a labor-intensive activity due to the process of physically relocating items within a facility as needed. The process of slotting can negatively impact the picking process since picking activities are generally slowed or halted while products are being relocated. Some slotting methodologies or algorithms use past demand as a predictor of future demand. However, predictability of item movement can be compromised when slow moving products are selected for rapid liquidation such as by putting them on sale. In this case, slow moving, unpopular items can become high velocity items causing historical demand to be a poor predictor of product popularity. Because of this and other disadvantages, many companies elect not to slot their products or to slot them infrequently.

One way of reducing travel time for product retrieval in a large warehouse storage area is to gather product in bulk for a large quantity of orders, using a single trip through the large warehouse storage area, and distributing those products into cells in a "put wall." A "put wall" can be a 3-dimensional matrix of cells, possibly containing totes or shipping containers, where each cell is used to store products gathered in bulk to comprise all or part of an order. A process to "put" the products into the cells sometimes involves scanning of a SKU bar code on one of the products, illuminating lighted numeric displays adjacent to one of more cells, and distributing multiple units of the product into these cells according to the quantities displayed or other methods. After the ordered quantity of each product for a box has been placed in a cell, the display adjacent to the cell, or a different display on the other end of the cell, if the cell is open on both ends, can be illuminated with a message or code indicating the cell has been filled with all required products for all or part of an order. In response to this message or code, the contents of the cell can be unloaded into a shipping container (if the cell was not loaded with a shipping container earlier) and the box can then be moved to the next step in order fulfillment such as taping, labeling or shipping. One of the problems with this process is that each product is "touched" multiple time—once when the product is picked, once when the product is distributed into put wall cells, and once when the product is removed from put wall cells and placed into shipping containers.

A stationary unit can be a bay unit or a digitally transformable mobile unit in a bay configuration.

Accordingly, it is an object of the present invention is to provide a pick/put system that can use mobile units transformable between stationary units to provide for efficient pick and put functionality.

Another object of the present invention is to provide a pick put system with transformable mobile units that do not necessarily require relocating popular and/or unpopular items.

Another objective of the present invention is to provide an efficient system to consolidate products gathered from fast velocity and slow velocity areas by dynamically transforming mobile units into stationary units such as "put walls."

Another objective to the present invention is to provide a pick/put system that can use dynamic put walls to reduce travel distance and time for picking products by using digitally transformable mobile units that can be transformed into stationary units (e.g. put walls) to reduce the number of times a product is touched.

SUMMARY OF THE INVENTION

The present invention represents improvements of earlier systems and more specifically in the presentation of transformable units between a mobile unit configuration and a stationary unit configuration. The transformable mobile units can include a light bar that can be a light assembly or an LED strip. An LED controller can be disposed between a light bar controller and the LED strip. By providing audio and visual assemblies, such as light bars, audio instructions, comments, HUDs and the like, that can be operatively associated with each other, improvements can be realized without the addition of moving parts, thereby increasing operational longevity of the system. The present invention can support picking methods that can slot products for each picking wave (collection of orders to be picked in a defined time period) without having to relocate the items and can consolidate parts of orders gathered from independent areas of a facility using both picking and put wall methods. The present invention can also support picking methods that can reduce both travel distance and the number of product touches associated with put wall processes.

The invention can provide dynamic slotting by including a set of transformable mobile unit computer readable instructions that can include instructions for picking items from a stationary location in a first phase, and, after digitally transforming the mobile unit to a stationary unit, indicate which of those items should be picked from that stationary unit during a second phase. The invention can include a stationary unit having a stationary unit light bar controller connected to a light bar controller and a transformable mobile unit having a mobile unit computer and a mobile unit light bar controller that can connect to a mobile unit light bar. In this arrangement the stationary unit light bar controller is in electronic communications with the mobile unit light bar controller; wherein in the mobile unit configuration, the set of transformable mobile unit computer readable instructions includes instructions for receiving item picking information representing item(s) to be picked from the stationary unit and placed on the transformable mobile unit. The second mobile unit can include a second mobile unit computer and a set of second mobile unit computer readable instructions for receiving item picking information representing item(s) to be picked from the transformable mobile unit and placed on the second mobile unit.

The invention can also provide the functionality of a dynamic put wall by having a set of transformable mobile unit computer readable instructions that includes instructions for picking items from a stationary location in a first phase and, after digitally transforming the mobile unit to a stationary put wall, and for indicating where items should be placed on a put wall during a second phase. The set of transformable mobile unit computer readable instructions can include instructions designating an intermediate physical area location to which the transformable mobile unit should be moved prior to transforming the transformable mobile unit from a mobile unit configuration to a stationary unit configuration.

The set of mobile unit computer readable instructions contained in a first mobile unit computer, used in the first phase described above, can include instructions for picking items from a set of first stationary unit shelf locations executing concurrently with sets of transformable mobile unit computer readable instructions contained in a set of other first mobile unit computers used to pick items from a set of stationary unit shelf locations. The set of second mobile unit computer readable instructions can include instructions for picking items from the transformable first mobile units after the first mobile units have been transformed to stationary units.

The first transformable mobile unit can be configured to pick item(s) from a first virtual subsection and a second transformable mobile unit can be configured to pick item(s) from a second virtual subsection.

The transformable mobile unit can be in communications with and receive instructions from a local server. The local server can be in communications with and receive instruction from a facility server.

The invention can include a stationary unit having a stationary unit light bar controller connected to stationary unit light bar for indicating the location of an item on the stationary unit to be picked; a digitally transformable mobile unit having a mobile unit computer and a mobile unit light bar controller, wherein the stationary unit light bar controller is in electronic communication with the mobile unit light bar controller; a set of transformable mobile unit computer readable instructions included with the digitally transformable mobile unit that can digitally transform the mobile unit from a mobile unit configuration to a stationary unit configuration and can (a) direct a user to a particular stationary unit and actuate the mobile unit light bar to identify a location on the digitally transformable mobile unit where the item picked from the stationary unit is to be placed on the digitally transformable mobile unit, when in the mobile unit configuration, and can (b) actuate the mobile unit light bar to identify the location of an item on the digitally transformable mobile unit to be picked when in the stationary unit configuration; and, a second mobile unit in communications with the digitally transformable mobile unit in the stationary unit configuration and having a second mobile unit computer, a second mobile unit light bar, and a set of second mobile unit computer readable instructions for actuating the second mobile unit light bar to identify the location on the second mobile unit where an item picked from the digitally transformable mobile unit in the stationary unit configuration is to be placed.

The invention can include an LED controller in communications with the mobile unit light bar controller; and, a light assembly in communication with the mobile unit light bar controller. The set of digitally transformable mobile unit computer readable instructions can include instructions for providing physical location information representing the physical location to place the digitally transformable mobile unit in an intermediate area prior to transforming the digitally transformable mobile unit from the mobile unit configuration to the stationary unit configuration.

The invention can include a first phase wherein the set of transformable mobile unit computer readable instructions can include instructions for instructing a worker to place the item on the digitally transformable mobile unit picked from a stationary location; and, a second phase wherein the set of second mobile unit computer readable instructions can include instructions for identifying the location on the second mobile unit to place the item picked from the digitally transformable mobile unit in the stationary configuration.

The set of transformable mobile unit computer readable instructions can include instructions for placing like items in adjacent sections on the digitally transformable mobile unit during the first phase, instructions for identifying the location to place a first item on the second mobile unit that is picked from the digitally transformable mobile unit in the stationary configuration; and, a third mobile unit having third mobile unit computer readable instructions for identifying the location to place a second item on the third mobile unit that is picked from the stationary unit. The set of transformable mobile unit computer readable instructions can include instructions for transforming the digitally transformable mobile unit in to a put wall.

A first digitally transformable mobile unit can be configured to instruct a first worker to pick an item from a first virtual subsection; and a second digitally transformable mobile unit can be configured to instruct a second worker to pick an item from a second virtual subsection. A dynamic slotting configuration can be included wherein the set of transformable mobile unit computer readable instructions can include instructions for instructing a worker to place items picked from a virtual partition. The set of digitally transformable mobile unit computer readable instructions can include instructions for limiting the number of item types that can occupy a unique digitally transformable mobile unit.

A second mobile unit can have a second mobile unit computer and a set of second mobile unit computer readable instructions for transmitting pickling instructions to the digitally transformable mobile unit in its stationary unit configuration and indicating the location on the second mobile unit where the picked item should be placed. The mobile unit computer can be removably attached to the mobile unit. The set of transformable mobile unit computer readable instructions can include instructions for transmitting picking information to a stationary unit light bar controller. The set of transformable mobile unit computer readable instructions can include instructions for transmitting picking information to a stationary unit light bar controller once the mobile unit is within a predetermined distance from the stationary unit.

The invention can include a stationary unit having a stationary unit light bar controller and stationary unit light bars connected to the stationary unit controller for actuating the stationary light bar to indicate a location of an item to be picked from the stationary unit; a digitally transformable mobile unit having a mobile unit computer and a mobile unit light bar controller; a set of transformable mobile unit computer readable instructions included in the mobile unit light bar controller for transmitting to the stationary unit light bar controller item picking information representing an item to be picked, actuating a mobile unit light bar indicating a location to place the item picked from the stationary unit on the mobile unit, and transforming the digitally transformable mobile unit from a mobile unit configuration to a stationary unit configuration. The set of transformable mobile unit computer readable instructions can include instructions for providing instructions to a worker to place the digitally transformable mobile unit in an intermediate area prior to transforming the digitally transformable mobile unit into a stationary unit. The set of transformable mobile unit computer readable instructions can include instructions from receiving item picking information from a server.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 6A and 6B are views of outputs of the invention;

DETAILED DESCRIPTION OF A PREFERRED EMBODIMENT

Figure 1:
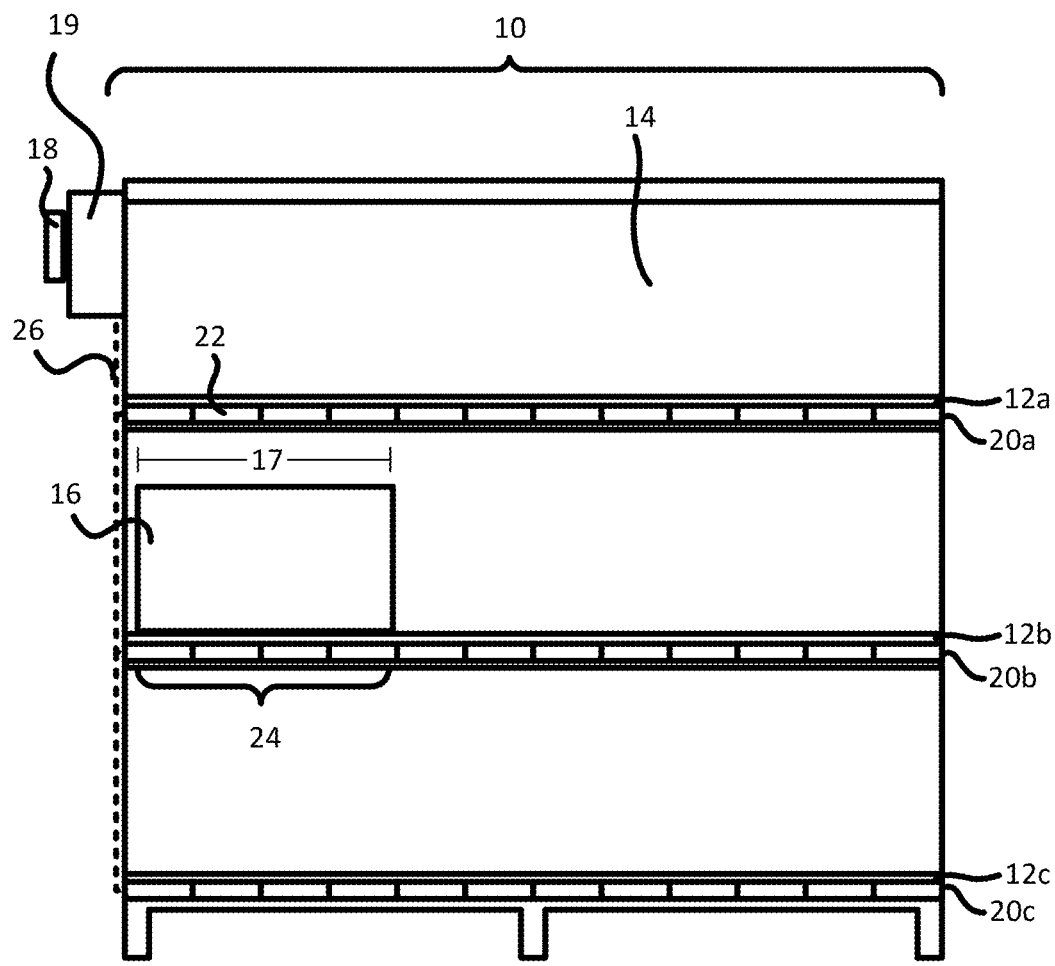
FIG. 1 is a front view of a stationary unit.

With reference to the drawings, the invention will now be described in more detail. The present invention is directed to a reconfigurable light-directed pick/put system which includes at least one stationary storage stationary unit including a plurality of reconfigurable physical storage locations containing stored items to be picked and a plurality of light bars (light assemblies and/or LED controllers with attached LED strips) attached to the stationary unit for directing the picking. Each of the light assemblies can include an intelligent circuit component, a visual display means, and a proximity switch means, and each of the light assemblies is positioned adjacent to a specific, physical storage location in a bay of storage locations. The invention can include LED strips that can be in communication with an LED controller that in turn contains a database of start and stop LED addresses and sends signals to LEDs to illuminate with different colors and intensities. The LED strips do not necessarily contain mechanical or proximity switches or visual display means.

Further, each of the light assemblies contains a specific light address associated with the physical location at which it is positioned. Upon reconfiguration of a physical storage location in order to accommodate items of differing size or quantity, the light bar associated with the reconfigured physical storage location is readily repositionable therewith. This is achieved by providing an elongated raceway at each shelf of the storage bay. Each raceway houses a plurality of movable light assemblies behind a transparent or translucent raceway cover. Each light bar assembly can include a proximity switch, which requires no moving parts.

In one embodiment, LED strips can be mixed with and provide a similar functionality to light assemblies. LEDs can be embedded on a conductive strip containing integrated circuits that are used to address and illuminate adjacent LEDs with different colors and intensities. Control logic can be part of an electronic circuitry component, which includes an LED controller connected to the LED strips. This LED controller can contain a database of start and stop LED addresses and upon receipt of a command from an external source, can send a signal to the integrated circuits between a start and stop address to illuminate the LEDs found between the start and stop addresses. Furthermore, this LED control computer can automatically send a reply to the external source reporting that a "virtual" proximity switch has been activated. The LED strip can include LED densities in the range of 10 to 200 LEDs per meter. An LED controller can be disposed between the LED strip and the mobile unit light bar controller (or stationary unit light bar controller) to translate and communicate information received from the mobile unit light bar controller (or stationary unit light bar controller) to light assemblies and can receive information from the mobile unit light bar controller, translate the information to an LED controller thereby removing the need for additional instructions or commands when LED strips are used. Further, a mix of LED strips and light assemblies can be used, and the mobile unit light bar controller or stationary unit light bar controller is agnostic to the type of hardware receiving or reacting to such instructions and commands.

Referring to FIG. 1, a bay unit 10 is represented schematically with shelves 12a through 12c. The shelves can include shelf cavities 14 that can contain items to be picked and can be placed directly onto the shelves or into shelf containers 16 that can hold items to be picked. In one example, the items are products that have been ordered from a customer that are to be picked, put, packed, and shipped to the customer. In one embodiment, a bay unit light bar controller 19 can include or be connected to a bay unit transceiver 18 and can be connected to light bars 20a through 20c. The bay unit transceiver can be integrated into the bay unit light bar controller or it can be external to and in electronic communications with the bay unit light bar controller. A warehouse or other location can include multiple bay units each with its own bay unit light bar controller.

When the light bars are comprised of LED strips, the LED strips can be configured to have discrete sub-sections 22 wherein the discrete sub-sections can be arranged to define a shelf segment 24. The LED strips can be controlled at the individual LED level so that a sub-section could be comprised of a single LED or multiple LEDs. Each shelf segment can be associated with an item location 16 that can be the physical location of the item, items, tote, or container on the shelf to be picked. The item location can have a width 17 that can be wider than a discrete segment. Therefore, segment 24 can be approximately the same width as the item location to better align the segment with the item location. The bay unit light bar or stationary unit light bar can include an LED controller and LED strips. The LED controller can receive information from the stationary unit light bar controller, translate the information from light bar controller protocols into LED controller protocols thereby actuating the LED strips accordingly. Each LED strip can be divided into sections and sub-section that can be associated with a shelf segment. These LED sections and sub-sections can contain, or alternate, between multiple colors allowing multiple mobile units to be used to pick items from the stationary units simultaneously. For example, a first mobile unit can be associated with red and a second mobile unit can be associated with green. When the section or segment adjacent to the item is illuminated, flashing, or otherwise actuated, it can inform the worker that the corresponding item should be picked. The light segment can be configured to display or flash a first color then a second color or display a fraction of the LEDs in a first sub-section in a first color and a fraction in a second sub-section in a second color, thereby allowing the light sub-sections to indicate items to be picked by multiple workers simultaneously.

Figure 2:
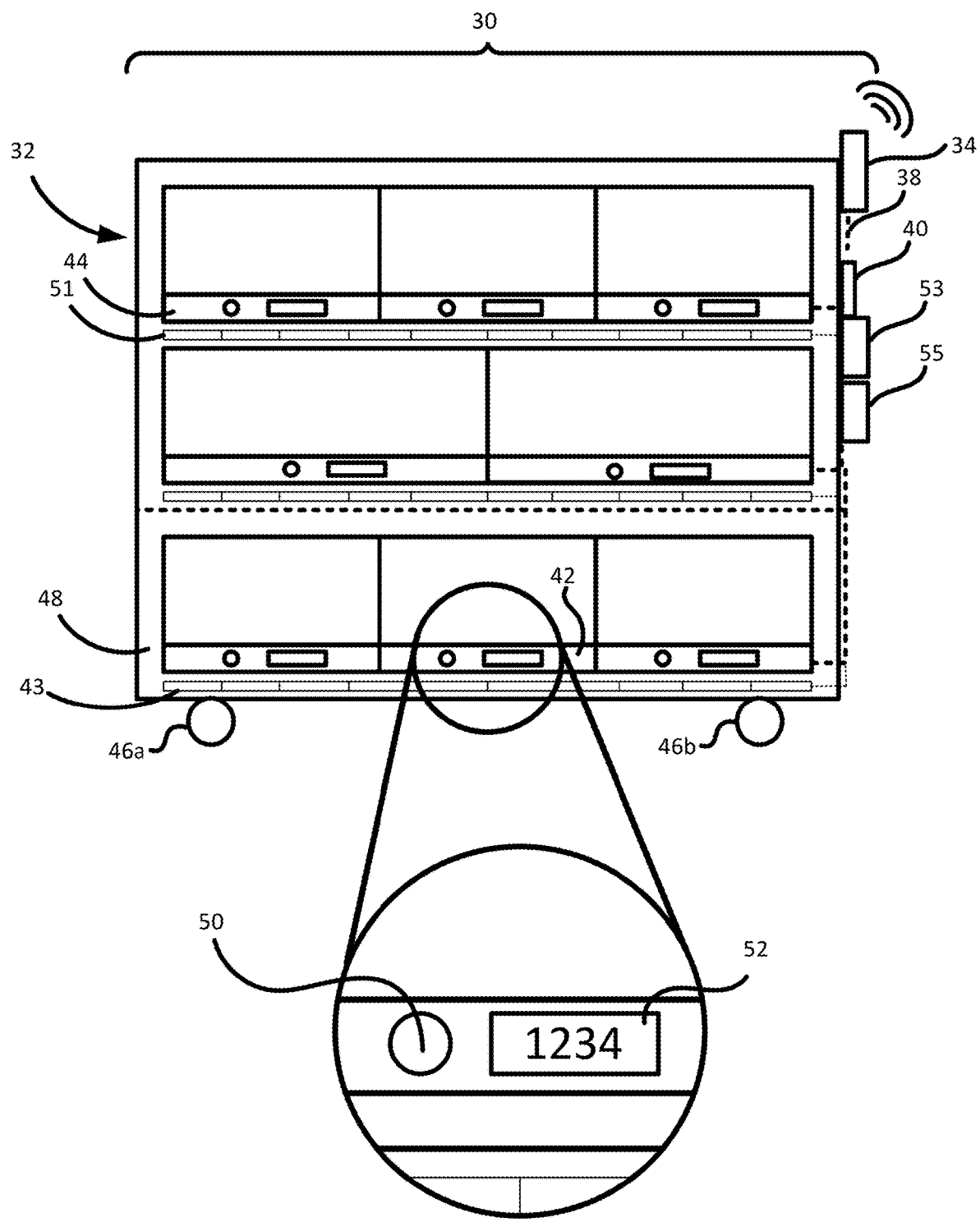
FIG. 2 is a front view of a mobile unit.

Referring to FIG. 2, each mobile unit 30 can include a storage area 32. The storage area can include shelves, partitions, or containers, such as totes or boxes, that can be removed from the mobile unit. A mobile unit computer 34 can be affixed to the mobile unit or removably attached to the mobile unit and can remain in wired or wireless electronic communications with various mobile unit components. The mobile unit computer can include a transceiver integrated into the mobile unit computer, or the mobile unit light bar controller or it can be in electronic communications through connection 38 to an external transceiver 40.

The mobile unit light bar controller can be in communication with a plurality of light bars that can include light assemblies 42 connected to a light bar controller 53. LED strips 51 can also be connected to the light bar controller or an LED controller 55. The LED controller can receive information from the mobile unit light bar controller, translate the information from light bar controller protocols into LED controller protocols thereby actuating the LED strips accordingly. In one embodiment, the light assemblies 42 are disposed along a raceway 44 allowing for variations in size of the bin, box, container or tote that is carried by the mobile unit. Each light bar can be adjacent to the container or shelf location, and in one embodiment under the container, so that the light bar placement on the mobile unit can be relatively positioned to the space associated with the light bar and account for the container or shelf location width.

The mobile unit can include casters 46a and 46b allowing the mobile unit to be moved about the facility floor. In FIG. 2, a mobile unit frame 48 supports a top shelf with three containers and adjacent light bar, a middle shelf with two containers and adjacent light bar, and a bottom shelf with three containers and adjacent light bar. LED strips can be used in place of light assemblies in certain configurations so that, for example, light assemblies 44 can be replaced with LED strip 51. Each light assembly can include a light assembly input 50 such as a proximity sensor, button, or other input device to allow the user/worker to input information into the light assembly. The use of a proximity switch for the light assembly input can simplify the picking process and advantageously present no movable parts for wear or breakage and enable the light assembly to operate in a sealed, transparent enclosure that can be configured to withstand corrosive treatment in harsh environments.

When an item is placed in the container, partition or other area on a mobile unit, the user can activate the associated light assembly input indicating the item has been picked and placed in the proper location. The information can then be communicated from the transceiver to the mobile unit light bar controller. For example, the light assembly can include a numeric display 52 that can display or otherwise designate the quantity of an item that is to be placed in one or more containers on the mobile unit. The mobile unit light bar controller can actuate one or more light assemblies, each of which could be used to display a quantity and identify a put location of a picked item. The light assembly on the stationary unit can indicate the quantity and location of items to be picked and the light assemblies on the mobile unit can indicate the quantity and location where the picked items are to be put on the mobile unit.

The LED strip can be configured to have a lighted segment of LEDs that represents a put location of an item placed on the mobile unit. In this case the quantity can be indicated on the display of the mobile unit computer, indicated with audio instructions provided by the mobile unit computer or other system components or indicated using a light bar assembly.

The numeric display on a light assembly can indicate a put location of an item placed on the mobile unit when the module unit is digitally transformed into a put wall configuration. In the put wall configuration, the put wall can be a 3-dimensional matrix of slots in which each slot contains items of an order or part of an order if all the items cannot fit into the largest shipping container and the order must be divided among several shipping containers. In one configuration, a light assembly can display numeric characters to indicate a location and/or quantity of items to put in the put wall such as a put wall slot. In one configuration, an LED strip can be included adjacent to each mobile unit location to indicate where an item is to be put when the mobile unit is in a put wall configuration.

A mobile unit can gather items from stationary units or stationary units and then the mobile unit can be digitally transformed into a stationary unit. Additional mobile units can then be used to pick items from the digitally transformed mobile unit now in its stationary unit configuration. The mobile unit can also be digitally transformed into a put wall configuration for receiving scanned items picked by other mobile units. When the mobile unit is transformed, it can be arranged to be a pick unit so that the operation of the mobile unit includes the same functionality as the stationary unit. The set of computer readable instructions of the mobile unit computer can include instructions that provide the functionality and operation of the mobile unit in the put configuration and can digitally transform the mobile unit to operate as a stationary unit in a pick configuration.

The use of a proximity switch allows light assemblies to be added, removed, or relocated to reconfigure an individual storage stationary or an entire facility. If a mechanical switch were used, rather than a proximity switch, it may be that the light assembly could only be acceptably reconfigured with substantial effort. Specifically, in some prior art systems, conventional contact switches have been attached to or are part of light assemblies that serve as part of the raceway cover. When the light assemblies are moved to the left or right the spacer sections of the raceway cover must be reduced or increased in size, usually by cutting and piecing together cut sections. To avoid such cutting and piecing of raceway spacer cover sections, cover spacer sections are oftentimes not used between the light assemblies or are not replaced after they have been removed. Missing raceway spacer cover sections often result in dirt and grime adversely affecting performance of the electronics in the light assemblies. The present invention, which can use proximity switches without buttons protruding through raceway covers, renders such facilities readily adaptable to reconfiguration related to changing location sizes without exposing the light assemblies housed behind the raceway cover to such dirt or grime. The use of light assemblies, with proximity switches along a raceway that run along the length of each shelf, allows the light assemblies to be movable left or right inside the raceway along the length of the shelves to accommodate reconfiguration of the containers' locations on the shelves.

An audio module can be included in the mobile unit computer 34 or otherwise included in the mobile unit to enable audio commands or instructions to be directed to the worker. Sample commands and instructions can include: "Stop", "Done", "Scan", "Pick", "Incorrect Item", "Move On", and the like. The audio instructions can be in multiple languages. The mobile unit light bar controller can send a "poll" command to a target stationary unit light bar controller and when the mobile unit is in close proximity to the target stationary unit for stationary unit light bar controller to receive the command, the stationary unit light bar controller can reply to the poll, thus in one embodiment allowing the mobile unit computer to verbally direct the worker to "STOP." After a worker has picked the required item(s) and placed it/them into indicated partitions or containers on a mobile unit, the worker can be directed (by using the location of the mobile unit and the traversal sequence of items to be picked) to the next item picking location and be notified of the quantity to pick.

Figure 3:
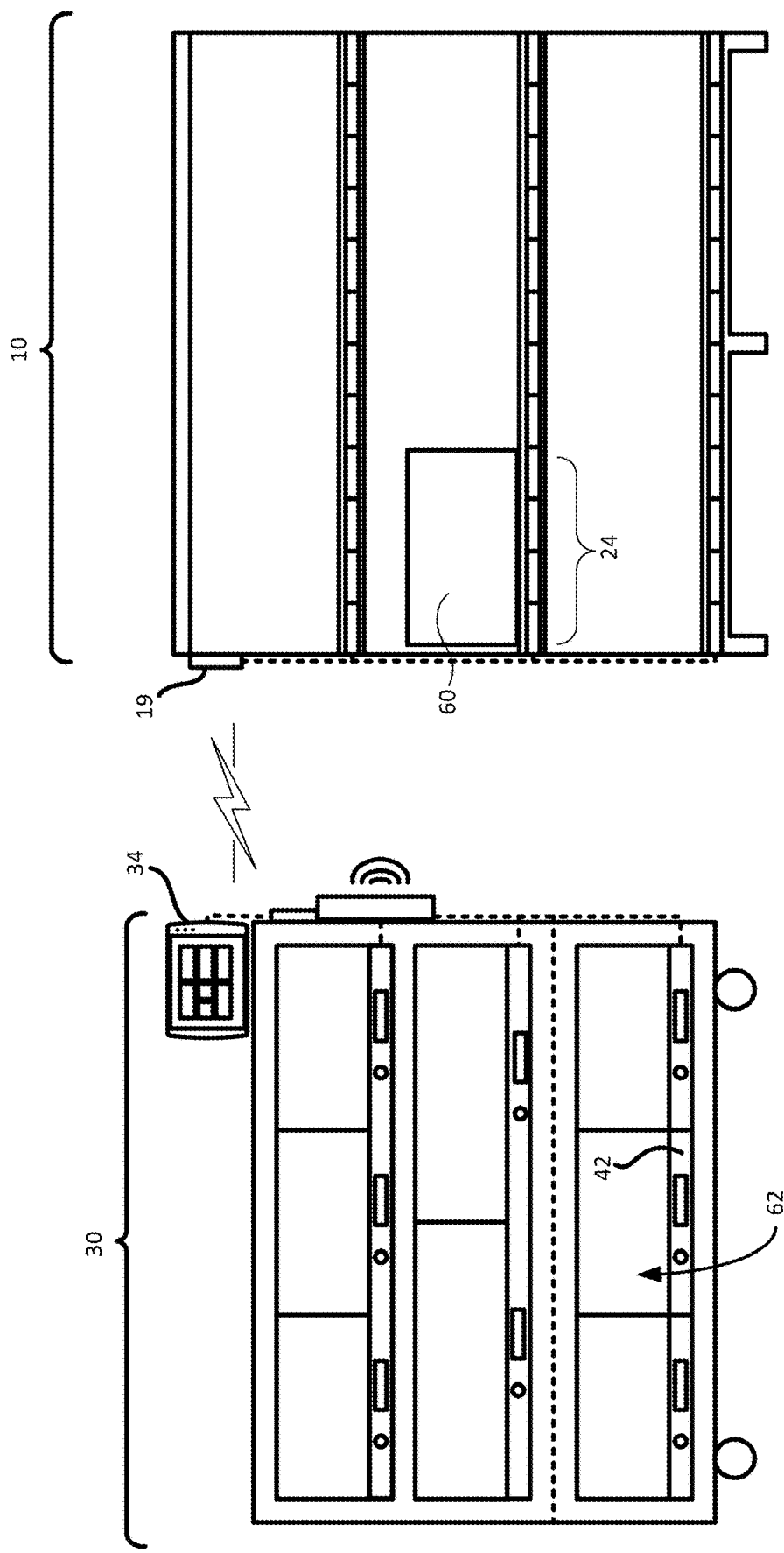
FIG. 3 is a front view of aspects of the pick/put system.

Referring to FIG. 3, the invention is shown in operation. A first item location 60 is included in a stationary unit 10 or a mobile unit that has been digitally transformed into a stationary unit. The first item location can include an item to be picked. When the mobile unit 30 is in sufficiently close proximity to the stationary unit 10 (or mobile unit transformed to a stationary unit), the mobile unit can communicate with the stationary unit. The shelf light bar associated with segment 24 on the stationary unit can be activated to indicate an item to be picked. The shelf light bar can be a visual indicator such as a light assembly or LED segment. The light bar 42 on the mobile unit can be actuated to indicate the put location 62 and the quantity to be picked and placed in the put location. The light bar on 10, whether a light assembly or LED strip, can flash, illuminate or otherwise indicate the item location representing an item to be picked. Audio information can also be provided to a worker to indicate the pick location, quantity to pick, and location to put the item on the mobile unit. The mobile unit computer can display a picture of the item to be picked, its location, and the quantity on the mobile unit computer display.

Figure 4:
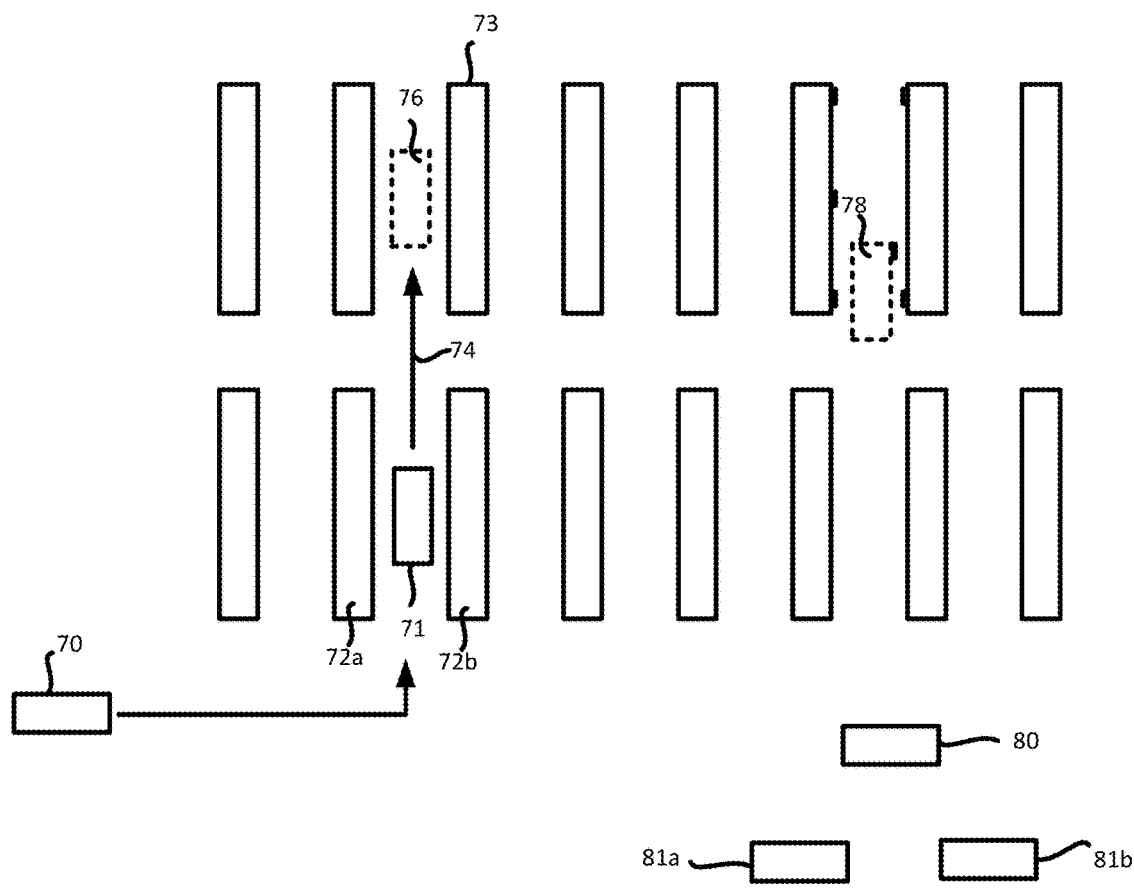
FIG. 4 is a top down diagram of the aspects of the invention in its operating environment.

Referring to FIG. 4, the mobile unit can initially be in a mobile unit configuration and stored at location 70. When in use, the mobile unit can be moved to an initial picking location 71, for example, in an aisle between stationary units such as 72a and 72b. When sufficient item(s) are picked and placed on the mobile unit from this initial location, the mobile unit computer can inform the worker that the worker should move the mobile unit to the next location by visual instructions, audio instructions or both. Visual instructions can be displayed on the mobile unit computer display or on a light assembly display and audio instructions can be provided by the audio module. The worker can move the mobile unit in direction 74 until a visual or audio instruction indicates a stopping point at location 76. The worker can then be instructed to pick item(s) from shelf 73 and placed them on the mobile unit. The proper light bar on the stationary unit can illuminate or otherwise indicate the item(s) to be picked as the mobile unit approaches the location of the item(s) on the stationary unit containing the item(s). The worker can then be instructed to move the mobile unit to location 78.

The mobile unit location 78 within the facility can be determined by several methods including triangulation, wireless communications, and others using the mobile unit's light bar controller to determine which of the stationary unit light bar controllers are in range. After determining the address and distance of such stationary unit light bar controllers, the mobile unit computer can determine the mobile unit's location, or approximate location, within the facility. The mobile unit can be directed to a final location 80 and digitally transformed into a stationary unit.

In one example, the mobile unit can then be digitally transformed from a mobile unit to a stationary unit once it is placed at location 80. Additional mobile units 81a and 81b can then pick items from the now stationary unit saving time and effort by not have to individually travel the aisles within the facility, but by simply picking items from the now stationary mobile unit. This example configuration can be advantageous when items must be picked for multiple orders on multiple mobile units and the items are in distant locations within the facility. Rather than each of these mobile units having to travel large distances to reach these distant locations, they need only travel a relatively short distance to pick items stored on the collection of the now stationary units (formerly mobile units having been digitally transformed to stationary units) near location 80. These multiple mobile units 81a and 81b can perform the same actions of mobile unit 70, but in a smaller area of the larger picking facility.

The light bar controller on the mobile unit can have a limited transmission range so that the bay unit or stationary unit light bar controller cannot detect the mobile unit light bar controller until the mobile unit is in close proximity to the stationary unit and the worker can see the stationary unit's light bar and be directed to the stationary unit location for an item to be picked. The stationary unit's light bar controller could have a limited transmission range so that the mobile unit's light bar controller cannot detect the stationary unit's light bar controller until the mobile unit's light bar controller is in close proximity the stationary unit and the worker can see the light bar and be directed to the stationary unit's location for an item to be picked. In summary, the stationary unit's light bar is only actuated when the worker is close enough to see the pick location on the stationary unit.

Further, the present invention is operational as a pick/put system when not all stationary units or shelves are equipped with light bars. It can be anticipated that some stationary units in a facility, perhaps in distant locations containing items that are infrequently picked, may not have light bars. Those items may be picked with instructions received from visual means, audio means, bar code scanning, or presentation instructions from the mobile unit computer. The mobile unit computer on one or more mobile units may include instructions to identify and direct picks of items stored in a facility in which none of the stationary units have light bar assemblies.

Figure 5:
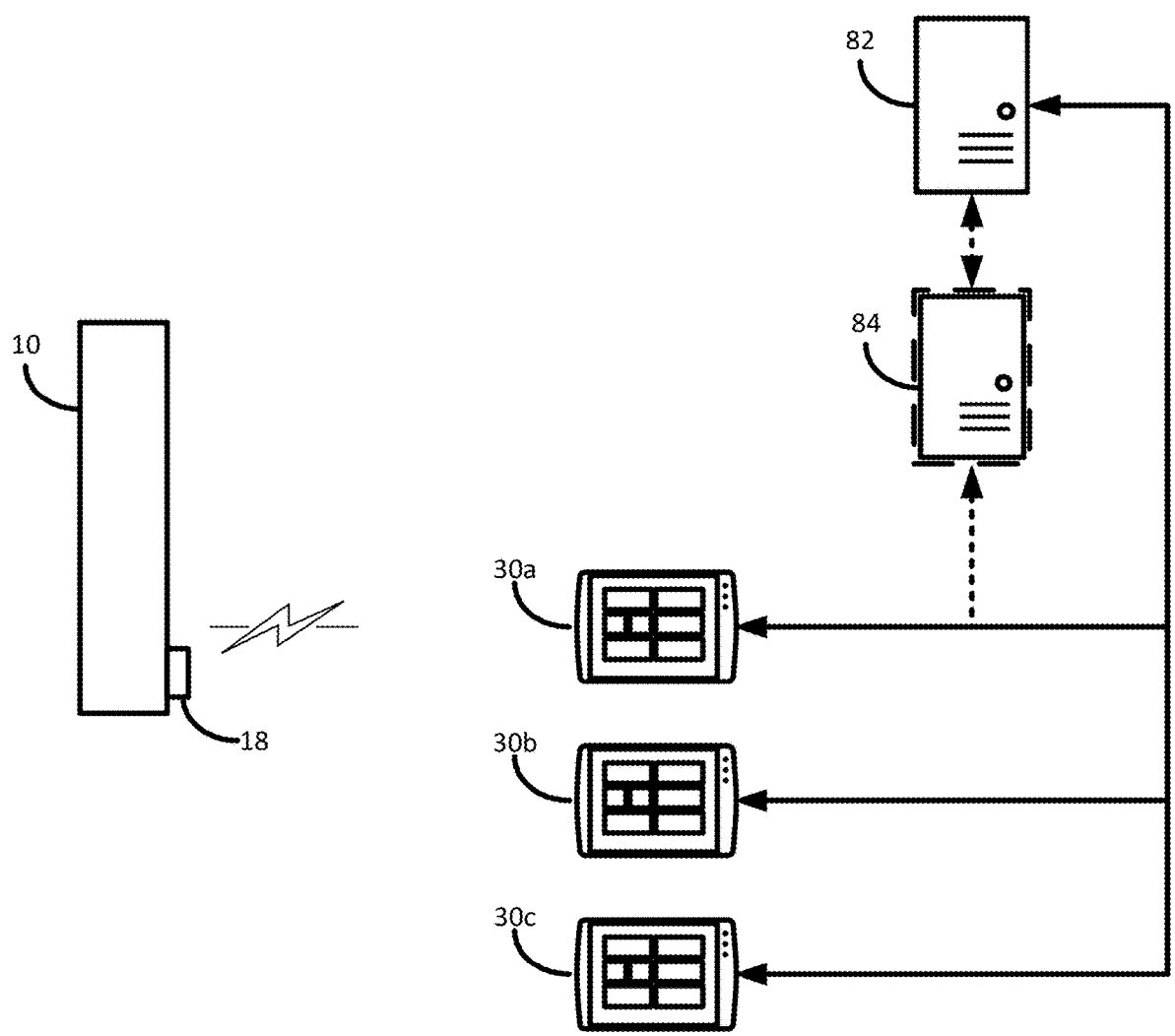
FIG. 5 is a schematic of aspects of the invention.

Referring to FIG. 5, a facility server 82 can communicate orders, including picking information, to a local server 84. The local server can be a separate computer system in communications with the facility server, a cloud-based computer system in communications with the facility server or part of the facility server 82. Multiple mobile unit computers on multiple mobile units 30a through 30c can receive and send information to the local server 84 that in turn can communicate the same information to the facility server 82. One advantage of separating the functionality provided by server 84 from that of server 82 is that server 82 is often offered by different suppliers and often in place before this invention is installed. Further, this separation can reduce or eliminate the need to modify servers to connect to and communicate with the network of mobile unit computers 30a through 30c. Instead, server 82 need only communicate with server 84 that in turn communicates with the network of mobile unit computers. Each of the mobile unit light bar controllers can communicate with stationary unit light bar controllers. Therefore, multiple mobile units can be used simultaneously to pick items for multiple orders and from multiple stationary units.

The communications can be directed to the mobile unit computer through a local server 84. The local server can communicate and receive information from server 82 that may support an Enterprise Resource Planning (ERP) system or Warehouse Management System (WMS). This information can be in by one or more of several available formats/methods including flat file (CSV or XML), database stored procedures, shared database tables, or IP messaging. Information used for picking can be transmitted from the local server to a mobile unit computer through a set of records including, for each item, a pick ticket number, picking location, and quantity of each item to be picked. The information returned from the mobile unit computer to the local server after picking can include minimally for each item a pick ticket number, picking location, quantity to be picked, and quantity picked. Additional information such as SKU, product description, photo, etc. can be transmitted to the mobile unit computer and additional information such as picker ID, time picked, serial number, lot number, etc. can be transmitted back to the local server after picking and made available for later processing.

Figure 6A:
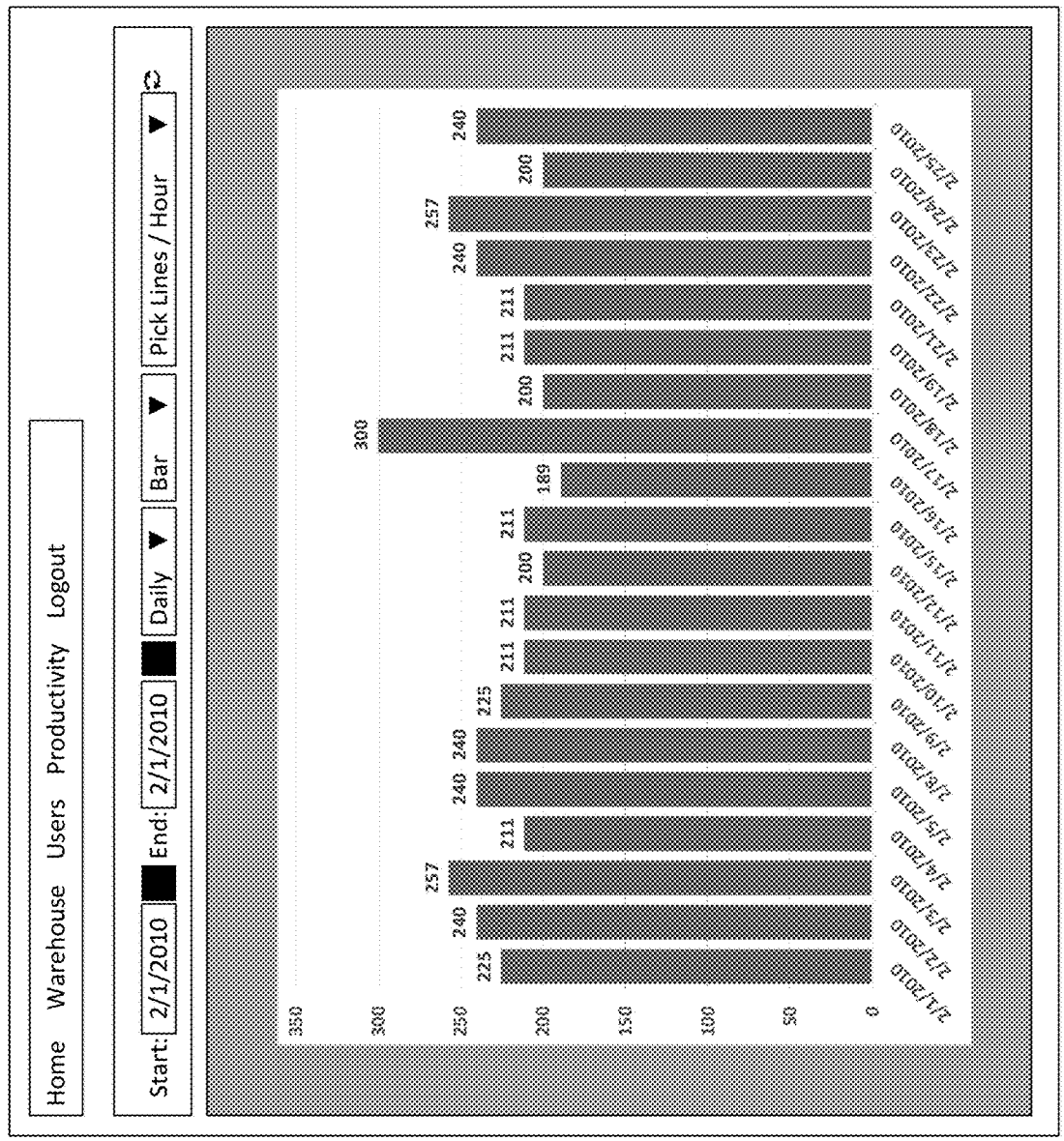

A reporting system can be used to allow workers to quickly identify actual and potential problems and opportunities for improving efficiency of the picking operation. Based on date/time range filters, the system can report various measures of picking performance by set of orders, time period, picking zones, individual pickers, etc. Measures can include statistics such as number of pick tickets, picking hours, number of pick lines, quantity ordered, quantity picked, average seconds per pick line, average lines picked per hour, average units picked per hour, and average seconds per unit to pick. The reporting system can provide statistics in both tabular reports and graphical form as shown in FIGS. 6A and 6B.

In one embodiment, the invention uses a distributed architecture model with multiple mobile unit computers, wherein each can have a set of computer readable instructions and a local database. Once pick instructions have been received by the mobile unit computer and stored in its local database, picking can commence with no further communications between the mobile unit computer and the local server. In one embodiment, the results of picking can be communicated in real-time from the mobile unit computer to the local server that in turn can communicate this information to the facility server. If, however, communications connectivity is unavailable or is interrupted (e.g. due to a communication dead spot in the facility) picking can continue using data stored in the mobile unit computer's local database. When communications are restored, the mobile unit computer's local database can be synchronized with the local server database.

Figure 7:
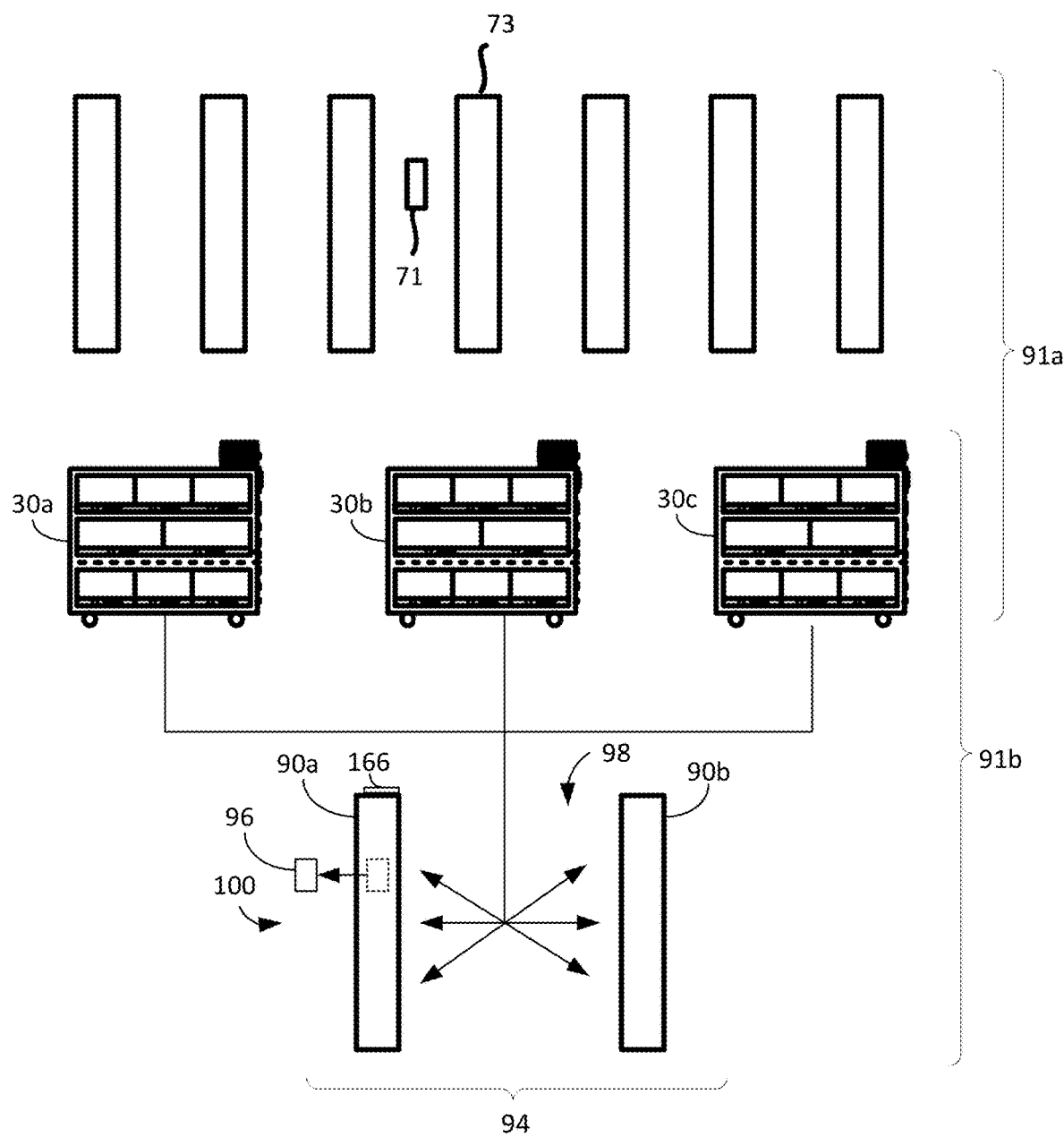
FIG. 7 is a schematic of aspects of the invention.

Referring to FIG. 7, a two-phase configuration is shown. Workers, during a first phase, can travel through the picking area 91*a* to gather products from shelves 73. Picking instructions representing an aggregation of items from multiple orders can be generated and transmitted to a mobile unit's computer such as on mobile unit 71. Therefore, one or more mobile units can be used to pick items in aggregate that are present in multiple orders so that efficiencies are realized by eliminating the need for a single mobile unit to be used to pick items for a limited set of orders contained on a single mobile unit. When the first phase is completed, for each mobile unit, the containers on that mobile unit have items that are in aggregate required for multiple orders. Each container on a mobile unit can be associated with and store items destined for a different put wall to further reduce the number of trips required to pick items for more orders than can be contained in a single put wall. The mobile units can then be used for the second phase of the configuration.

Put walls 90*a* and 90*b* can be located on area 94 where the containers, holding items picked in aggregate, on the mobile units can be unloaded. The put walls can contain shelves with slots that can be accessed from both sides of the shelves so that each put wall slot can have a front and rear. When the mobile units are moved to the put wall area, the containers on the mobile unit can be removed and can be placed near their associated put walls so that the mobile unit can be used for additional picking. A worker can, for each item or item SKU in the removed container, use a put wall computer 166 to scan a bar code on the item or otherwise identify the item. The identification information in the bar code can be used to access information in a database of order items associated with the identification information and used to illuminate one or more light bars to indicate the slot on the put wall where the item should be put. The worker can trigger one or more proximity switches, using a hand or other opaque object, or other input device after the items are put into slots on the put wall so that the light assemblies are extinguished, and the next item or item SKUs are ready for putting.

When light assemblies are used, the quantity to be put into a put wall slot can be displayed on the light assembly. If multiple workers are scanning products, in one embodiment, for the same put wall, each worker or can be assigned a different scanner alpha-numeric character and that character can be used as a prefix to the quantity displayed in a light assembly (for example, 2-13 would indicate scanner 2 should place 13 items into the slot). This allows multiple workers to place items in slots on put wall. Once all items for an order have been placed in a put wall slot, the items can be retrieved from the put wall slot and sent to a packaging area 100 and to a shipping area. Light assemblies at the rear of the put wall can be actuated to designate put wall slots ready for packing. Completion of packing an order from a specific slot can be reported by activating a proximity switch or scanning a barcode on the put wall slot. Once the items are removed from the put wall slot, the slot can then be designated as available for putting and packing another order.

Figure 8A:
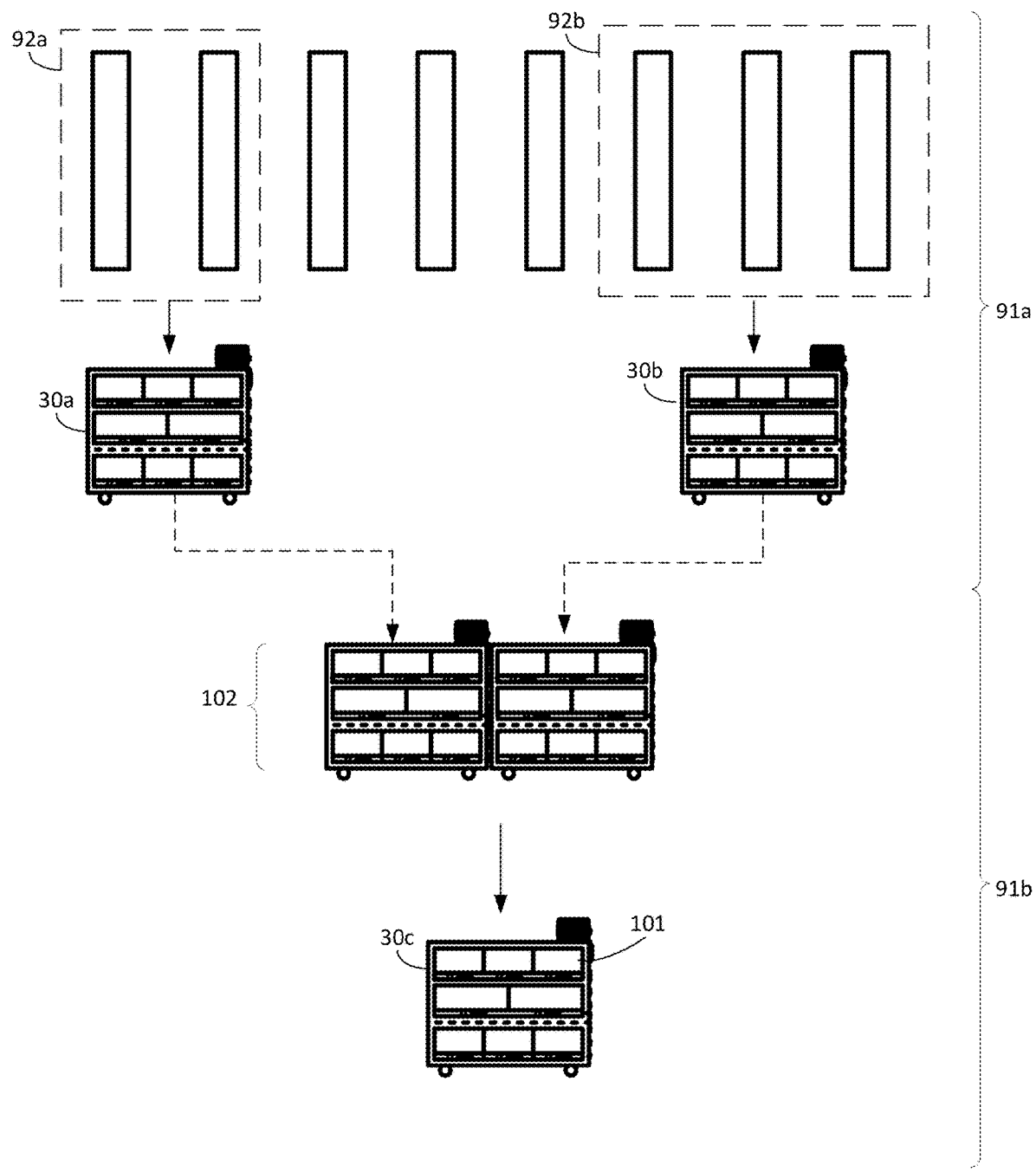
FIGS. 8A and 8B are schematics of aspects of the invention.

Referring to FIG. 8A, a dynamic slotting configuration is shown. In this configuration, a local server, sometimes termed an optimizer computer, can receive information concerning the item quantities and item locations to be picked for one or more orders. These orders can be determined by a facility server as a result of a "waving" process executed on the facility server and transmitted to the optimizer computer. The optimizer computer can contain computer readable instructions to aggregate items from multiple orders by SKU and facility location into a batch. The optimizer computer readable instructions can determine the physical location and physical distance between the items on the stationary units in the batch. With this information, the optimizer computer readable instructions can then logically group items to be picked based upon item physical location, commonality of SKUs, quantity, proximity to each other, and the like. The optimizer computer readable instructions can create virtual, mutually exclusive subsections, 92*a*, 92*b*, etc. of the facility that can be assigned to multiple mobile units. For example, in a phase one, as shown in 91*a*, mobile unit 30*a* can be provided item picking instructions for items that are in a virtual subsection 92*a*. Mobile unit 30*b* can be provided picking instructions for items that are physically located in virtual subsection 92*b*. Additional mobile units and virtual subsections can be defined and used in a similar way. The virtual subsections can be defined, and mobile unit assigned to the virtual subsections so that the completion of picking of all the items in the batch is completed at approximately the same time. These optimizer computer readable instructions can increase efficiency and reduce the time and distance traveled for any on mobile unit in comparison to each mobile unit being assigned individual orders with associated order items.

The mobile units used for this phase one configuration can be physically larger than those typically used for individual order picking. When picking has been completed, the mobile units can be taken to an intermediate area of the facility to start a phase two operation as shown in 91*b*. The mobile units can be placed in close proximity to each other in the intermediate area 102, where they can be digitally transformed by the mobile unit computer into stationary units. The items in the batch are now located in a smaller area as opposed to the original, larger area in the facility and consequently this smaller area can make subsequent order picking more efficient can results in a reduced travel distance.

After the mobile unit has been digitally transformed by the mobile unit computer to operate in an intermediate area pick configuration, the mobile unit can provide similar functionality to that of a stationary unit. Second mobile unit 30c can receive a subset (batch) of the order data comprising the wave used in phase one that can direct second mobile unit 30c to the intermediate area 102 to pick items from the digitally transformed mobile units now operating as stationary units 30a and 30b. The second mobile unit 30c can include containers 101, such as totes or boxes, that can receive items from stationary units 30a and 30b in intermediate area 102 and be placed in these containers that can also be used for shipping orders. This configuration can improve efficiency by reducing worker travel time and consequently reduce picking time. The completion of picking all orders in all batches can define the end of picking for the wave of orders and the phase two process can be terminated. The now stationary mobile units can be transformed back to mobile units for subsequent phase one picking.

During this dynamic slotting configuration, bulk storage locations of items in the facility need not be changed, routine picking need not be interrupted, and the traditional downtime required for slotting can be reduced or eliminated. Order picking using multiple mobile unit's orders can be performed simultaneously using the dynamic picking configuration.

Figure 8B:
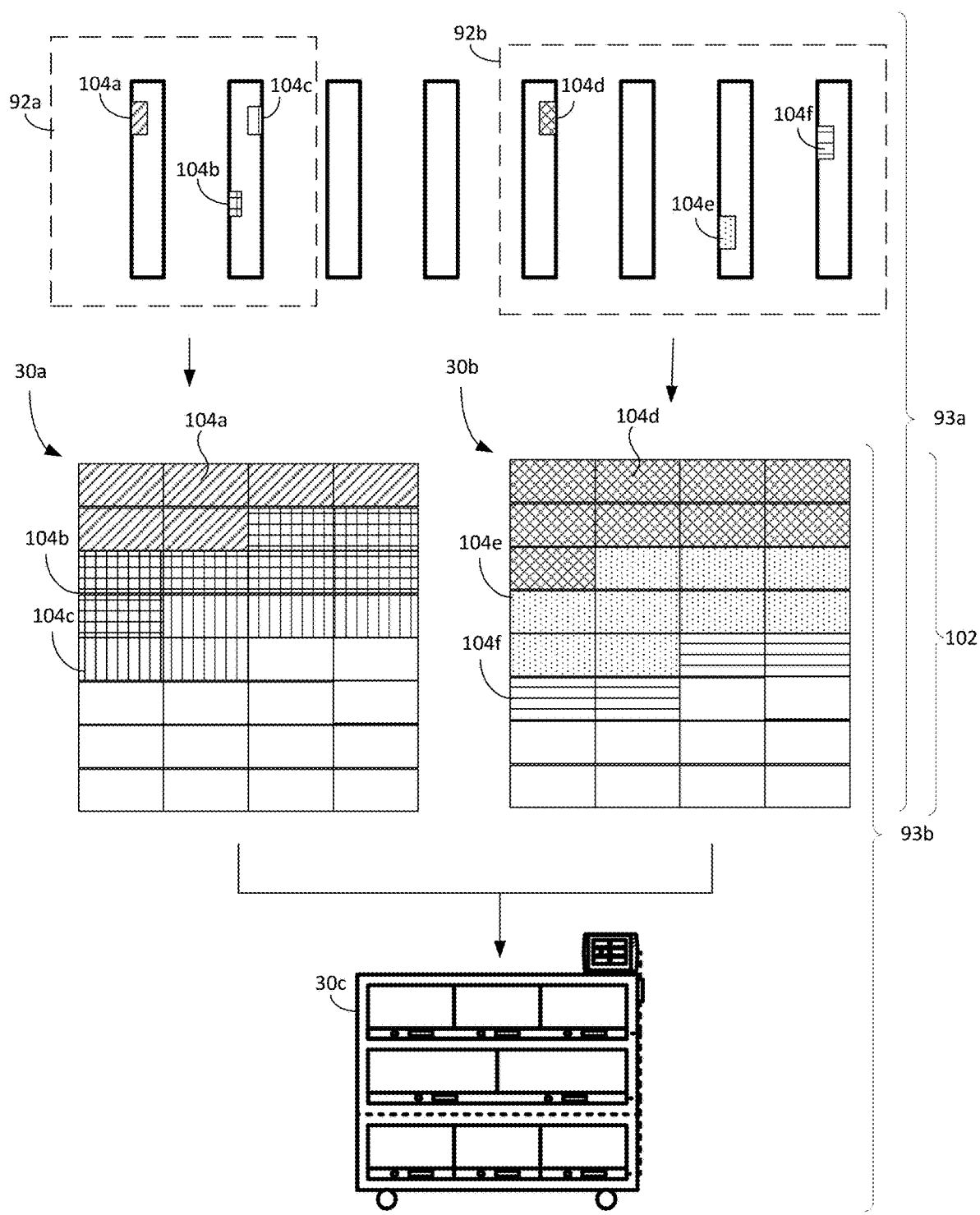

Referring to FIG. 8B, an intermediate aggregation configuration, such as dynamic slotting, is shown. In this configuration a phase one, as shown in 93a, is used to pick items and place them on the mobile unit 30a wherein the mobile unit computer is provided with item picking instructions associated with a virtual partition 92a. In this configuration, like items, such as those having the same SKU, can be retrieved from each of locations 104a through 104f and placed on the respective mobile unit. Items in locations 104a through 104c can be retrieved from virtual subsection 92a, based upon the criteria stated herein to define virtual subsection 92a. The mobile unit computer can place the mobile unit in a configuration where picking information instructs the worker to pick selected items and place them into one or more locations on the mobile unit with the restriction that only one item type (e.g. SKU number) can occupy a unique mobile unit location. Light bars or audio instructions direct the worker to place items on the mobile unit in designated locations, each with or without a container at the location. Locations can be one container on the mobile unit or multiple containers if the number or size of required items in a container exceeds the container capacity. For example, item 104a can be placed into six contiguous locations on the top and second row of the mobile unit, items 104b follows item 104a and item 104c follows item 104b. A second mobile unit 30b can be designated for partition 92b where items 104d through 104f are stored.

During a second phase 93b, the mobile units 30a and 30b can be digitally transformed into stationary units and placed in an intermediate area 102. After the mobile units 30a and 30b have been transformed, they are in a pick configuration. A non-transformed mobile unit computer on mobile unit 30c can receive instructions so that a worker can place items into containers on non-transformed mobile unit 30c after picking those items from digitally converted units 30a and 30b, wherein these digitally transformed units 30a and 30b serve as pick locations and provide for dynamic slotting.

Put wall processing can be a two-phase process in which a wave of orders is downloaded from a facility server and during a phase one, items are picked in aggregate by SKU for an entire wave of orders from a large picking area containing unpopular, slow moving, infrequently picked items. During a phase two process, these items are scanned and light bars adjacent to slots on a put wall are illuminated indicating where items are to be put. The advantage of put wall processing is that the travel time to pick slow moving items is greatly reduced since rather than traveling the large area for each batch of orders in a wave, the large area is traveled once for all batches of orders in the wave, while picking items aggregated by SKU for those orders. The disadvantage of traditional put wall processing is that each item must be handled three times: once for picking the product in bulk, once while scanning the product and putting it in a put wall slot and once while removing the time from the put wall slot and placing in a shipping container. The invention herein, by using dynamic put walls, largely overcomes the traditional disadvantages while maintaining the efficiencies put wall processing.

Figure 9:
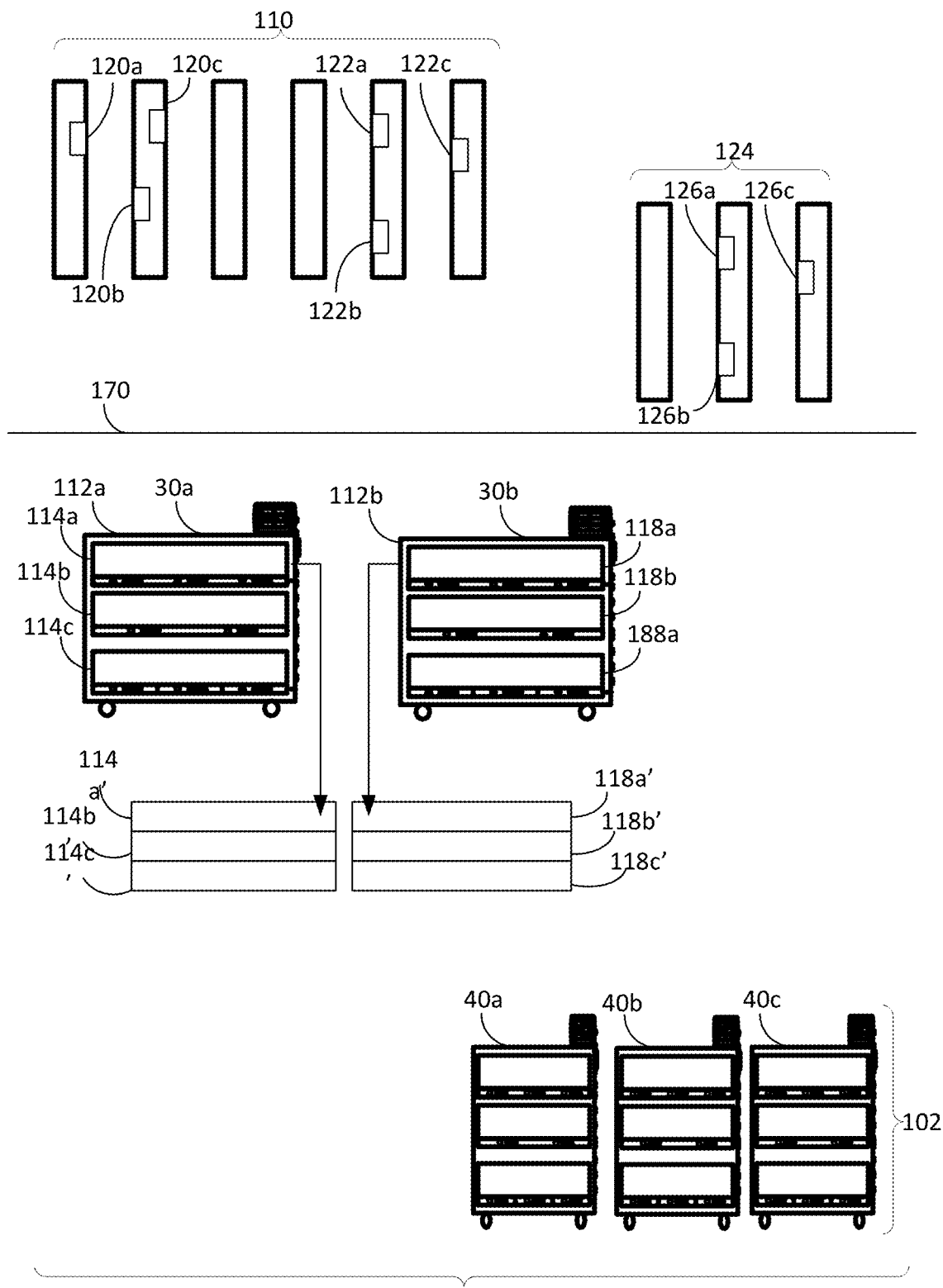
FIG. 9 is a schematic of aspects of the invention.

Referring to FIG. 9, a dynamic put wall configuration is shown. As described in traditional put wall processing, in a warehouse or other storage facility, there are typically fast moving, frequently picked items and slow moving, infrequently picked items. In some facility configurations that have been through a slotting process, the slow or slower moving items are stored physically farther away from the start 170 of the picking process while the fast-moving items are stored physically closer to the start of the picking process. As a result, mobile units can access these fast-moving items with shortened travel times and access the slow-moving items with longer travel times. The slow-moving items can be stored in a bulk area 110. Virtual subsections can be defined in the bulk area to balance or equalize the picking workload in each virtual subsection.

In the dynamic put wall configuration there can be bulk mobile units, used in a slow-moving area, and order mobile units, used in a fast-moving area. Bulk mobile units 112a and 112b can be used to pick items from the slow moving, bulk storage area 110. For example, a first bulk mobile unit 112a can cover storage areas 114a through 114c and second bulk mobile unit 112b can cover storage areas 116a through 116c.

Each container on a bulk mobile unit can be associated with a particular order mobile unit. In this case, items picked from the bulk area are placed on the bulk mobile unit into containers in an arrangement corresponding to the associated order mobile units. Using the first bulk mobile unit 112a, quantities of item 120a can be placed into a tote at location 114a, into a tote at location 114b, and into a tote at location 114c. In a similar way, items 120b and 120c can be placed into the same totes at locations 114a, 114b, and 114c. Items 120a through 120c can be associated with a first virtual subsection of the bulk area 110. Using the second bulk mobile unit 112b, quantities of item 122a can be placed in totes at location 118a. In a similar way, items 122a, 122b, and 122c can be placed in totes at locations 118a, 118b, and 118c. Items 122a through 122c can be associated with a second virtual subsection of the bulk area 110. Therefore, items from different locations in the bulk area can be placed on bulk mobile units in containers associated with specific order mobile units. The bulk mobile units can then be moved to an intermediate location 102 where each tote from one or more bulk mobile units would be unloaded and associated with an order mobile unit. For example, totes 114a' and 118a' can be associated with a first order mobile unit, totes 114b' and 118b' can be associated with a second order mobile and totes 114c' and 118c' can be associated with a third order mobile unit, Concurrently with the bulk mobile units picking items from the slow-moving item bulk area, the order mobile unit 40*a* can be used to pick items from a slotted, fast moving item area 124. Therefore, fast moving items of the orders in a wave could be placed into shipping containers on the order mobile unit 40*a*. The order mobile units 40*a* through 40*c*, initially configured in a pick configuration, can be digitally transformed by their mobile unit computers into put wall configurations. Items in the bulk containers can be scanned and light bars on each put wall illuminated, indicating the location where the scanned items must be placed. Therefore, mobile units 40*a* through 40*c* can contain items picked from the fast-moving area before being digitally transformed to serve as put walls in an intermediate area 102 and receive items picked into totes by mobile units 30*a* and 30*c*. As a result of the digital transformation, mobile unit 40*a* through 40*c* can avoid traveling through the slow-moving area 110. Since mobile units 30*a* and 30*b* are retrieving items from slow moving area 110 concurrently with mobile unit 40*a* through 40*c* retrieving items from area 124, efficiencies are realized by reducing the total picking time for the one or more orders.

Figure 10A:
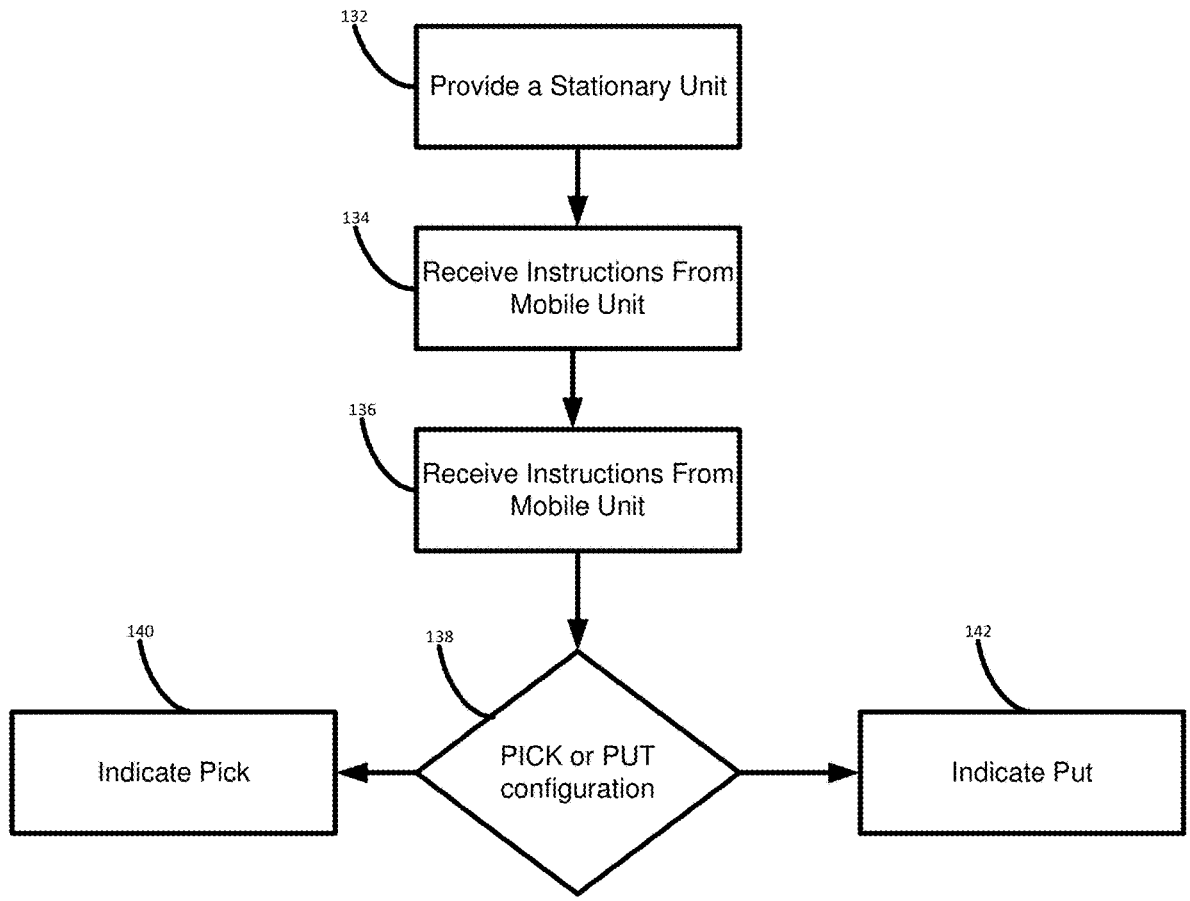
FIGS. 10A and 10B are flowcharts illustrating aspects of the invention.

Referring to FIG. 10A, the operation of the invention in various configurations is shown. The mobile unit has the ability to be digitally transformed by the mobile unit computer to operate in several configurations including a transformed stationary unit or put wall.

A stationary unit can be located in a storage facility such as a warehouse at 132. The stationary unit can include a capability to receive a set of digital commands from a mobile unit computer at 134. The stationary unit can receive picking or put commands and actuate a light bar or audio module. A determination can be made at 138 as to whether the stationary unit is in a pick or put configuration. In the stationary unit pick configuration, the set of stationary unit computer digital commands can include commands for indicating one or more locations on the stationary unit where items are to be picked at 140. The set of stationary unit computer readable instructions can include instructions for configuring the stationary unit into a put configuration at 142.

Figure 10B:
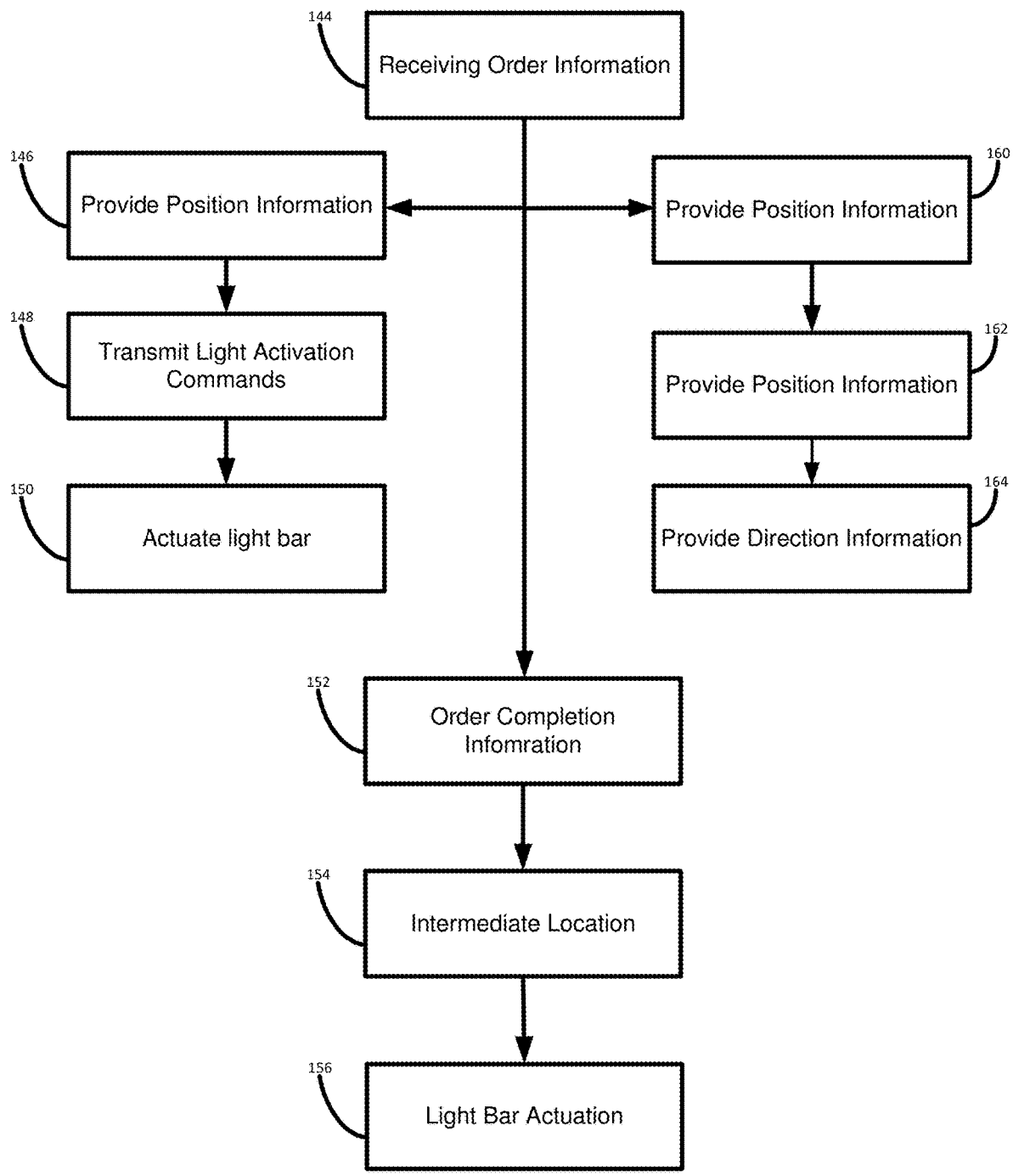

Referring to FIG. 10B, the mobile unit computer can include a set of mobile unit computer readable instructions that can be executed in a first configuration, such as a mobile unit configuration, for receiving order information at 144. This order information can represent for each item to be picked, facility location information, quantity information, and the put location on the mobile unit where the target item should be placed. The physical location where a worker is to position the mobile unit, can be communicated from the mobile unit computer to a worker at 146. Light actuation commands, representing item location information and item quantity information, can be transmitted from the mobile unit light bar controller to the stationary unit light bar controller at 148. The mobile unit light bar controller can actuate a light bar at 150 indicating the put location of the item on the mobile unit. Item pick completion information transmitted from the stationary unit computer can be received at 152, confirming that the correct item and correct quantity has been moved from the stationary unit to the mobile unit.

The mobile unit can then display intermediate location information at 154 informing a worker that the mobile unit is to be placed at an intermediate location and digitally transformed to operate as a stationary unit. Actuation instructions can be received at 156 from a second mobile unit to actuate the transformed mobile unit (now operating as a stationary unit) light bar according to the received instructions to indicate one or more locations on the unit where items to be picked are located and placed on the second mobile unit.

In a third configuration, information can be provided at 160 to a worker to pick items from a first stationary unit to be put on a first mobile unit. Such information can be provided at 162 to the worker to pick items from a shelf on a stationary unit, transformed mobile unit, virtual subsection or the like, to be put on a first mobile unit. Such information can be provided at 164 for directing a worker to pick items from a second mobile unit, after having been digitally transformed to operate in a stationary unit configuration, to be put on the first mobile unit. The set of mobile unit computer readable instructions can also include instructions for receiving image information, such as a bar code, from an image scanner and determining if the image information represents a stationary unit, a stationary unit partition, an item, or a mobile unit.

Figure 11:
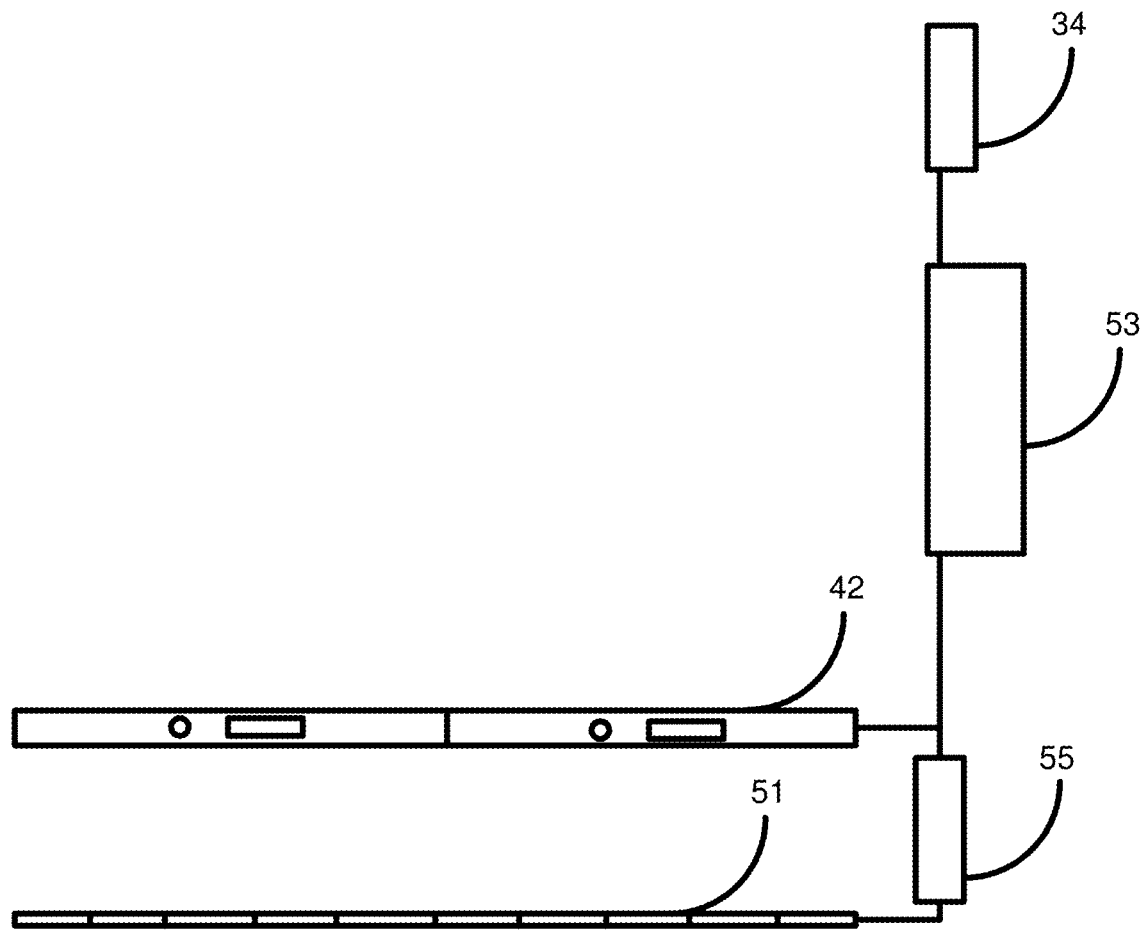
FIG. 11 is a schematic of aspects of the invention.

Referring to FIG. 11, the invention can include a mobile unit light bar controller 53 that can mounted on a mobile unit. In one configuration, the mobile unit light bar controller can be connected to light assemblies inside a raceway. The mobile unit light bar controller can receive information from a mobile unit computer 34, and in response to the received information, actuate one or more light assemblies 42. The light assemblies can be replaced with an LED strip 51. An LED controller 55 can be connected to the mobile unit light bar controller 53 and be configured to receive instructions that typically are sent to light assemblies, translate those instructions into instructions recognized by the LED strip, and transmit the translated instructions to the LED strip, thereby actuating segments of the LED strip according to the pick or put instructions without further modifications, in hardware or software. For stationary units the LED controller can be connected to the stationary unit light bar controller on the shelf and translate the instructions that typically are sent to the light assemblies on the stationary unit, translate the instructions into those recognized by the LED strip that can be placed on a stationary unit, and transmit those instructions to the LED strip thereby actuating the LED strip according to the pick or put instructions without further modifications, in hardware or software, of the stationary unit. For stationary units, the LED controller can be connected to the stationary unit light bar controller and translate the instructions that typically are sent to the light assemblies on the stationary unit, translate the instructions into those recognized by the LED strip that can be placed on the stationary unit, and transmit those instructions to the LED strip thereby actuating the LED strip according to the pick or put instructions without further modifications, in hardware or software, of the stationary unit. Therefore, the stationary unit light bar controller and instructions has no dependence on the type of light, light assembly or LED strip.

In one embodiment, the stationary unit light bar controller receives information from the mobile unit light bar controller only when the mobile unit is within a predetermined proximity from the stationary unit light bar controller. The LED controller can, according to an actuation command, actuate one or more LED lights included in the LED strip defining a segment associated with an item location on the stationary unit.

Figure 12:
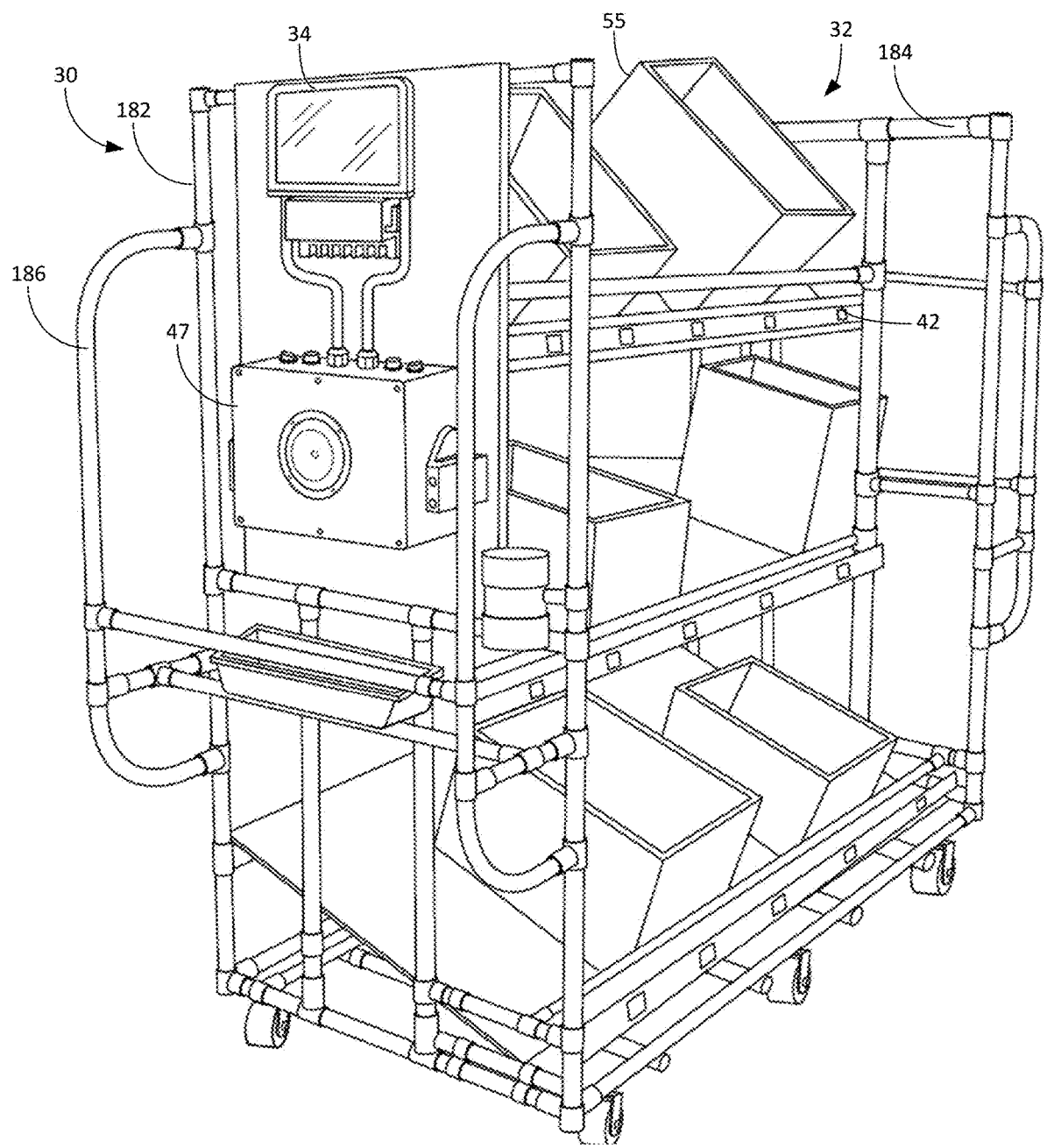
FIG. 12 is a perspective view of aspects of the invention.
Figure 13:
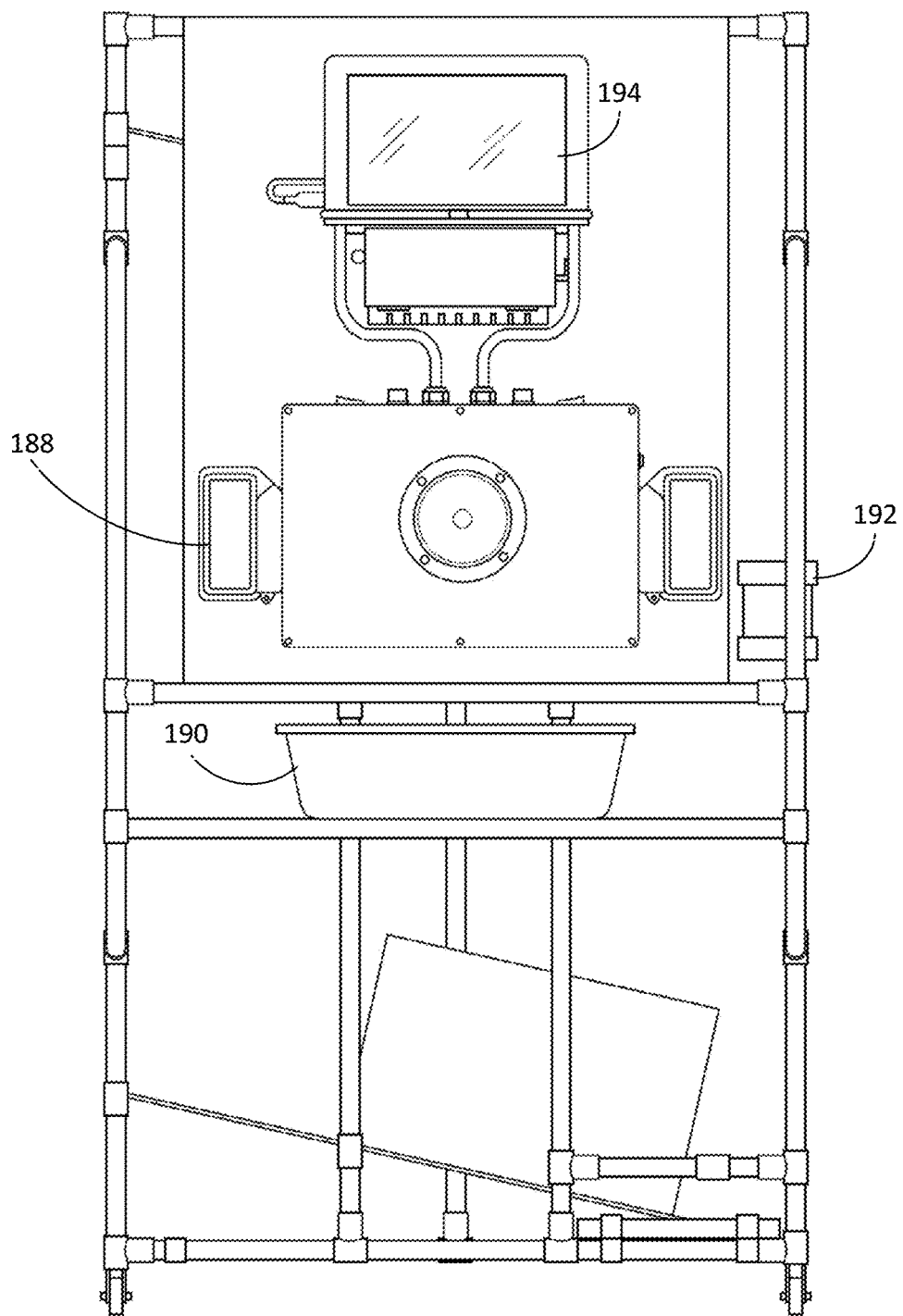
FIG. 13 is side view of aspects of the invention.

Referring to FIG. 12, the transformable mobile unit 30 is shown having a storage area 32 than can hold a container 55 disposed above light bar 42. The mobile unit computer 34 can be a tablet or other computer device. Audio module 47 can be connected to the mobile unit computer. The mobile unit can include a frame having vertical members 182 and horizontal members 184. Handle assembly 186 can be attached to one or both sides of the mobile unit. Referring to FIG. 13, the mobile unit computer can be powered by its internal power supply (e.g. battery) or can be charged through an external power supply 188. In one configuration, the external power supply can be portable batteries commonly used for power tools. The external power supply can also power the light bars, light bar controller, LED controller and audio module. A utility tray 190 can be attached or removably attached to the mobile cart to carry items of the worker such as a bar code scanner. Drink holders 192 can be attached to the mobile unit. The worker can be provided instructions and can enter input using display 194 which can be a touch screen. The audio module can be integrated into the mobile unit computer.

Aspects of this invention improve the functioning of the computer used for this invention and can analyze real world events. Computer readable instructions, when executed by a computer processor, cause the computer to perform a series of steps to accomplish a specific task and result in useful, concrete and tangible results adding substantially more to the operation of a general computer. The computer instructions improve the functioning of the computer itself to provide a novel improvement of the function of the computer and technology as described herein. These computer readable instructions are tied to a particular machine or apparatus with the specific purpose of executing the computer readable code for accomplishing tangible results and accomplishing the manipulation of physical data.

The details herein may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result, when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code or instructions may not be contained within one file or one storage medium but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by one or more sets of computer readable instructions or code. These flowcharts, with the written description, illustrate the improvement in the technology and technical field of this invention.

Elements of the flowchart support combinations of means for performing the special functions, combination of steps for performing the specified functions and program instruction means for performing the specified functions. It will be understood that each block of the flowchart illustrations can be implemented by special purpose hardware-based computer systems that perform the specified functions, or steps, or combinations of special purpose hardware or computer instructions.

The present invention has been described with reference to the drawings in which the preferred embodiment of the invention is shown. This invention may, however, be embodied in many different forms and should not be construed as limited to the embodiments set forth herein. Rather, these embodiments are provided so that this disclosure will be thorough and complete and will fully convey the scope of the invention to those skilled in the art.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A dynamically reconfigurable pick-put system comprising:
    a stationary unit having a stationary unit light bar controller connected to stationary unit light bar for indicating a location of an item on the stationary unit to be picked;
    a digitally transformable mobile unit having a mobile unit computer, a mobile unit light bar controller, and a mobile unit light bar wherein the stationary unit light bar controller is in electronic communication with the mobile unit light bar controller; and,
    a set of transformable mobile unit computer readable instructions included with the mobile unit computer that can digitally transform the digitally transformable mobile unit from a mobile unit configuration to a stationary unit configuration and can (a) direct a user to a particular stationary unit, actuate the mobile unit light bar to identify a location on the digitally transformable mobile unit where an item picked from the stationary unit is to be placed on the digitally transformable mobile unit, when in the mobile unit configuration, and (b) actuate the mobile unit light bar to identify the location of an item on the digitally transformable mobile unit to be picked when in the stationary unit configuration.

2. The system of claim 1 including a second mobile unit in communications with the digitally transformable mobile unit in the stationary unit configuration and having a second mobile unit computer, a second mobile unit light bar controller, a second mobile unit light bar, and a set of second mobile unit computer readable instructions for actuating the second mobile unit light bar to identify the location on the second mobile unit where an item picked from the digitally transformable mobile unit in the stationary unit configuration is to be placed.

3. The system of claim 2 wherein the set of second mobile unit computer readable instructions includes instructions for identifying the location to place a first item on the second mobile unit that is picked from the digitally transformable mobile unit in the stationary configuration; and,
    a third mobile unit having third mobile unit computer readable instructions for identifying the location to place a second item on the third mobile unit that is picked from the stationary unit.

4. The system of claim 2 including:
    a first phase wherein the set of transformable mobile unit computer readable instructions includes instructions for instructing a worker to place the item on the digitally transformable mobile unit picked from a stationary location; and,
    a second phase wherein the set of second mobile unit computer readable instructions includes instructions for identifying the location on the second mobile unit to place the item picked from the digitally transformable mobile unit in the stationary configuration.

5. The system of claim 4 wherein the set of transformable mobile unit computer readable instructions includes instructions for placing like items in unique sections on the digitally transformable mobile unit during the first phase.

6. The system of claim 1 wherein the set of transformable mobile unit computer readable instructions includes instructions for providing physical location information representing a physical location to place the digitally transformable mobile unit in an intermediate area prior to transforming the digitally transformable mobile unit from the mobile unit configuration to the stationary unit configuration.

7. The system of claim 1 wherein the set of transformable mobile unit computer readable instructions includes instructions for transforming the digitally transformable mobile unit into a put wall.

8. The system of claim 1 wherein:
    the digitally transformable mobile unit is a first digitally transformable mobile unit and is configured to instruct a first worker to pick an item from a first virtual subsection; and,
    a second digitally transformable mobile unit having a second mobile unit light bar controller and a second mobile unit light bar and configured to instruct a second worker to pick an item from a second virtual subsection.

9. The system of claim 1 including a dynamic slotting configuration wherein the set of transformable mobile unit computer readable instructions includes instructions for instructing a worker to place items picked from a virtual partition.

10. The system of claim 1 wherein the set of transformable mobile unit computer readable instructions include instructions for limiting a number of item types that can occupy a unique digitally transformable mobile unit.

11. A dynamically reconfigurable pick-put system comprising:
    a digitally transformable mobile unit having a mobile unit computer and a light bar controller;
    a light bar in electronic communications with the light bar controller taken from the group consisting of a light assembly, an LED strip or combination thereof;
    a set of transformable mobile unit computer readable instructions included with the digitally transformable mobile unit that can digitally transform the digitally transformable mobile unit from a mobile unit configuration to a stationary unit configuration; and,
    wherein in the mobile unit configuration, the set of transformable mobile unit computer readable instructions includes instructions for providing item picking information to a worker representing an item to be picked from a stationary unit and placed on the digitally transformable mobile unit and transforming the digitally transformable mobile unit from the mobile unit configuration to the stationary unit configuration.

12. The system of claim 11 including a second mobile unit having a second mobile unit computer and a set of second mobile unit computer readable instructions for transmitting picking instructions to the digitally transformable mobile unit in its stationary unit configuration and indicating a location on the second mobile unit where a picked item should be placed.

13. The system of claim 11 including a light assembly in electronic communication with the light bar controller.

14. The system of claim 11 including an LED controller in communications with the light bar controller and having LED controller computer readable instruction for translating information received from the light bar controller and actuating an LED accordingly.

15. The system of claim 11 wherein the mobile unit computer is removably attached to the digitally transformable mobile unit.

16. The system of claim 11 wherein the set of transformable mobile unit computer readable instructions includes instructions for transmitting picking information to a stationary unit light bar controller.

17. The system of claim 11 wherein the set of transformable mobile unit computer readable instructions includes instructions for transmitting picking information to a stationary unit light bar controller once the digitally transformable mobile unit is within a predetermined distance from the stationary unit.

18. A dynamically reconfigurable pick-put system comprising:
 a stationary unit having a stationary unit light bar controller and stationary unit light bar connected to the stationary unit light bar controller for actuating the stationary unit light bar to indicate an item location of an item to be picked from the stationary unit;
 a digitally transformable mobile unit having a mobile unit computer and a mobile unit light bar controller;
 a set of transformable mobile unit computer readable instructions included in the mobile unit computer for transmitting to the stationary unit light bar controller an item picking information representing an item to be picked, actuating a mobile unit light bar indicating a location to place an item picked from the stationary unit onto the mobile unit, and transforming the digitally transformable mobile unit from a mobile unit configuration to a stationary unit configuration.

19. The system of claim 18 wherein the set of transformable mobile unit computer readable instructions includes instructions for providing instructions to a worker to place the digitally transformable mobile unit in an intermediate area prior to transforming the digitally transformable mobile unit into a stationary unit.

20. The system of claim 18 wherein the set of transformable mobile unit computer readable instructions includes instructions from receiving item picking information from a server.

* * * * *